United States Patent
Matsuda et al.

(10) Patent No.: US 6,609,147 B1
(45) Date of Patent: Aug. 19, 2003

(54) INFORMATION PROCESSING APPARATUS, INFORMATION PROCESSING METHOD, AND INFORMATION PROVIDING MEDIUM

(75) Inventors: Koichi Matsuda, Tokyo (JP); Taketo Naito, Kanagawa (JP); Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/227,689

(22) Filed: Jan. 8, 1999

(30) Foreign Application Priority Data

Jan. 20, 1998 (JP) .......................................... P10-022711

(51) Int. Cl.$^7$ ............................................. G06F 15/16
(52) U.S. Cl. ....................................... 709/205; 345/769
(58) Field of Search ................................ 709/203, 204, 709/205, 206, 207; 345/329, 330, 355

(56) References Cited

U.S. PATENT DOCUMENTS

| | | | |
|---|---|---|---|
| 5,393,070 A | 2/1995 | Best | 273/434 |
| 5,572,646 A | 11/1996 | Kawai et al. | 395/501 |
| 5,586,257 A | 12/1996 | Perlman | |
| 5,659,691 A | 8/1997 | Durward et al. | |
| 5,727,950 A | 3/1998 | Cook et al. | |
| 5,754,740 A | 5/1998 | Fukuoka et al. | |
| 5,761,644 A | 6/1998 | Ueda et al. | |
| 5,802,296 A | 9/1998 | Morse et al. | |
| 5,812,126 A | 9/1998 | Richardson et al. | |
| 5,826,266 A * | 10/1998 | Honda | 707/9 |
| 5,848,134 A | 12/1998 | Sekiguchi et al. | 379/93.15 |
| 5,850,352 A | 12/1998 | Moezzi et al. | |
| 5,880,731 A | 3/1999 | Liles et al. | |
| 5,884,029 A * | 3/1999 | Brush, II et al. | 709/202 |
| 5,926,179 A * | 7/1999 | Matsuda et al. | 345/355 |
| 5,941,770 A | 8/1999 | Miers et al. | |
| 5,956,028 A * | 9/1999 | Matsui et al. | 345/329 |
| 5,956,038 A | 9/1999 | Rekimoto | 345/419 |
| 5,956,485 A | 9/1999 | Perlman | |
| 5,966,129 A | 10/1999 | Matsukuma et al. | |
| 5,966,526 A | 10/1999 | Yokoi | |
| 5,971,855 A | 10/1999 | Ng | |
| 5,982,372 A | 11/1999 | Brush, II et al. | |
| 5,983,003 A | 11/1999 | Lection et al. | |
| 5,999,208 A * | 12/1999 | McNerney et al. | 345/330 |
| 6,009,460 A | 12/1999 | Ohno et al. | |

FOREIGN PATENT DOCUMENTS

| | | | |
|---|---|---|---|
| JP | 7-160853 | 6/1995 | |
| JP | 9-81781 | 3/1997 | G06T/17/00 |

OTHER PUBLICATIONS author unknown, vCard: The Electronic Business Card, version 2.1, A Versit Consortium White Paper, [http://www.imc.org/pdi/vcardwhite], Internet Mail Consortium, Jan. 1997, 4 pages.*

S. Chen et al., "The Out of Box Experience: Lessions Learned Creating Compelling VRML 2.0 Content," Proceedings of the Second Symposium on Virtual Reality Modeling Language, Feb. 1997, pp. 83–92.

B. Damer et al., "Peopled Online Virtual Worlds: A New Home for Cooperating Communities, A New Frontier for Interaction Design (Panel)," Proceedings of the ACM Conference on Computer Supporter Cooperative Work, Nov. 1996, pp. 441–442.

(List continued on next page.)

Primary Examiner—Patrice Winder
(74) Attorney, Agent, or Firm—Oblon, Spivak, McClelland, Maier & Neustadt, P.C.

(57) ABSTRACT

Communication between users not accessing a shared virtual reality space at the same time is realized. A client terminal sends a calling card and a mail. A hard disk drive of a mail server holds the calling card and the mail. When a user to whom the calling card and the mail are to be sent accesses the shared virtual reality space, the mail server transfers the calling card and the mail to the client terminal.

18 Claims, 33 Drawing Sheets

OTHER PUBLICATIONS

S. Harrison et al., "Re–Placeing Space: The Roles of Place and Space in Collaborative Systems," Proceedings of the ACM Conference on Computer Supporter Cooperative Work, Nov. 1996, pp. 67–76.

R. Lea et al., "Community Place: Architecture and Performance," Proceedings of the Second Symposium on Virtual Reality Modeling Language, Feb. 1996, pp. 41–50.

B. Damer, "Inhabited Virtual Worlds: A New Frontier for Interaction Design," Interactions, vol. 3, Issue 5, Sep./Oct. 1996, pp. 27–34.

W. Broll, "Populating the Internet: Supporting Multiple Users and Shared Applications with VRML," Proceedings of the Second Symposium on Virtual Reality Modeling Language, Feb. 1997, pp. 33–40.

D. Kurlander et al., "Comic Chat," Proceedings of the $23^{rd}$ Annual Conference on Computer Graphics, Aug. 1996, pp. 225–236.

K. Perlin et al., "Improv: A System for Scripting Interactive Actors in Virtual Worlds," Proceedings of the $23^{rd}$ Annual Conference on Computer Graphics, Aug. 1996, pp. 205–216.

"Web–On–Call Voice Browser" Product Background, General Magic, Material Collected from the Internet, http://www.pngcomptuers.com/webon.htm, 4 pages.

"Sony Begins OEM Sales of Community Place VRML 2.0 3D Internet Browser and Multi–User Server Software," Jan. 30, 1997 Press Release, Material Collected From the Internet, http://www.world.sony.com/corporateinfo/news–e/199701/9701–30/index.html, 3 pages.

"VRML 2.0 Laboratory–How to Create," Material Collected From the Internet, Mar. 8, 2000, http://www.ses.co.jp/ses/staff/kan/howto/howto1.html, 5 pages.

Virtual Reality Modeling Language Version 2.0, ISO/IEC CD 14772, Aug. 4, 1996, Section 4, "Concepts".

M. Benedikt (Editor), "Cyberspace: First Steps," The MIT Press, Fourth Printing, 1992, pp. 273–300.

M. Pesce, "VRML Browsing & Building Cyberspace," New Riders Publishing, 1995, pp. 43–81.

K. Matsuda, "Latest Trends of VRML and Cyberpassage VRML 2.0 and JAVA," Part 1, Bit, Jul. 1996, vol. 28, No. 7, pp. 29–36.

K. Matsuda, "Latest Trends of VRML and Cyberpassge VRML 2.0 and JAVA," Part 2, Bit, Aug. 1996, vol. 28, No. 8, pp. 57–65.

Y. Honda, "Latest Trends of VRML Cyberpassage VRMl +Network=CyberspaceΔ"Part 3, Bit, Sep. 1996, vol. 28, No. 9, pp. 29–36.

Y. Honda, "Latest Trends of VRML and Cyberpassage How to Build Multi–User Environment Using Cyberspace," Part 4, Bit, Oct. 1996, vol. 28, No. 10, pp. 49–58.

Nikkei Electronics, Sep. 9, 1996, No. 670, pp. 151–159.

Nikkei Electronics, Apr. 7, 1997, No. 686, pp. 131–134.

* cited by examiner

FIG. 2

ROUTE <u>Node Name</u>.<u>event Out Name</u> TO <u>NodeName</u>.<u>event In Name</u>
(ROUTE DECLARATION) (NODE NAME) (EVENTOUT NAME) (NODE NAME) (EVENTIN NAME)

FIG. 8

| No | VIRTUAL REALITY LIFE OBJECT DATA ||||||| KEEPER DATA ||| RESERVE |
|---|---|---|---|---|---|---|---|---|---|---|---|
| | 3D OBJECT ID | COORDI-NATE AXIS | KIND | NICK-NAME | GENDER | BIRTH DATE | BIRTH PLACE WORLD | GROWTH PARAMETER || NAME | COMMUNI-CATION MEANS | ADDRESS | |
| | | | | | | | | PHYSICAL PARAMETER | MENTAL PARAMETER | | | | |
| 1 | Obj 1 | x1,y1,z1 | MONKEY | Taro | MALE | 970112 | Zoo | | | Hiroyuki Hanaya | 0 | hanaya @ipd.sony.co.jp | |
| 2 | Obj 1 | x2,y2,z2 | CAT | Mike | FEMALE | 970210 | Park | | | Kouich Matusumoto | 1 | 03-5448-4443 | |

| COMMUNICATION MEANS ||
|---|---|
| 0 | ELECTRONIC MAIL |
| 1 | TELEPHONE (ANALOG VOICE) |
| 2 | WIRELESS MAIL SERVICE |
| 3 | FAX |
| 4 | PAGER |
| 5 | RESERVED |
| 6 | RESERVED |
| 7 | RESERVED |

| HEIGHT cm | WEIGHT kg | PHYSIQUE INDEX | APPETITE INDEX | HEIGHT INDEX | LIFE SPAN REMAINED |
|---|---|---|---|---|---|
| 50 | 10 | 5/10 | 6/10 | 4/10 | 240 |

| INTELLIGENCE QUOTIENT | LANGUAGE PROFICIENCY INDEX | SOCIABILITY INDEX | INDEPENDENCE INDEX | ACTIVITY INDEX | MOOD INDEX |
|---|---|---|---|---|---|
| 2/10 | 5/10 | 2/10 | 1/10 | 5/10 | 5/10 |

INFORMATION PROCESSING APPARATUS, INFORMATION PROCESSING METHOD, AND INFORMATION PROVIDING MEDIUM

BACKGROUND OF THE INVENTION

The present invention generally relates to an information processing apparatus, an information processing method, and an information providing medium. More particularly, the present invention relates to an information processing apparatus, an information processing method, and an information providing medium that implement the exchange of information between users through an object in a virtual reality space.

A cyberspace service named Habitat (registered trademark) is known in so-called personal computer communications services such as NIFTY-Serve (registered trademark) of Japan and CompuServe (registered trademark) of US in which a plurality of users connect their personal computers via modems and public telephone networks to the host computers installed at the centers of the services to access them in predetermined protocols.

Development of Habitat started in 1985 by Lucas Film of the US, operated by Quantum Link, one of US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) as virtual reality objects into a virtual reality city called Populopolis drawn by two-dimensional graphics to have a chat (namely, a realtime conversation based on text entered and displayed) with each other in the virtual reality city. For further details of Habitat, refer to the Japanese translation "pp. 282–307" of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010.

In the conventional cyberspace systems operated by personal computer communications services such as mentioned above, a virtual reality street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual reality space. Also, the two-dimensional virtual reality space in which own avatar and the avatar of another user are displayed is viewed from a viewpoint of a third party, thereby impairing the sense of simulated experience.

To overcome this drawback, a capability that enables a user to walk as desired with the viewpoint of the avatar of the user in a virtual reality space represented in three-dimensional graphics is realized by use of a three-dimensional graphics data description language called VRML (Virtual Reality Modeling Language) as disclosed in Japanese Patent Laid-open No. Hei 09-81781 corresponding to U.S. patent application Ser. No. 08/678,340. Considerations about various cyberspaces in which chat is made by use of the avatar of a user are described in NIKKEI Electronics, Sep. 9, 1996, No. 670, pp. 151–159.

Recently, breeding simulation games for breeding tropical fish and a virtual reality creature having artificial intelligence living in a virtual reality world for example have come to be available as personal computer software programs. A product is also known that displays a simulated pet such as a dog or a cat on an electronic notepad to enjoy the process of its growth (refer to NIKKEI Electronics, Apr. 7, 1997, No. 686, pp. 131–134). In addition, "Tamagotchi" (registered trademark) developed and commercialized by Bandai Co. is widely known that is an egg-sized portable virtual reality pet with a breeding simulation game program as mentioned above incorporated.

Virtual reality pets of this type have a CPU (Central Processing Unit), a ROM (Read Only Memory), a RAM (Random Access Memory) and so on mounted on a single-chip LSI (Large Scale Integration), a breeding simulation game program being stored in the ROM, the figure and state of the pet being displayed on an LCD (Liquid Crystal Display) device. The user gives such instructions by operating buttons as "feed" and "clean up" for example necessary for breeding the virtual reality creature as a pet. As a result of caring, the virtual reality creature displayed on the LCD grows stepwise from an egg to a chick to a grown-up bird for example in its external view.

The virtual reality creature is programmed such that proper instructions given help the virtual reality creature grow without problem and improper instructions given make it sick or, in the worst case, die. Further, the virtual reality creature is programmed to make various requests based on the time elapsing from its birth provided by an incorporated calendar timer. For example, in the nighttime zone, the virtual reality creature requests a sleep and, in the mealtime zone, it requests food. In other times, the virtual reality creature requests, at random, snack and play for example. If the user fails to answer these requests properly, the growth of the virtual reality creature may be retarded or its character worsens. If the user answers properly, the life of the virtual reality creature is lengthened.

Meanwhile, Japanese Patent Laid-open No. Hei 07-160853 corresponding to U.S. Pat. No. 5,572,646 discloses a technology applicable to an electronic notepad for example for displaying images according to the growth processes of a virtual reality creature such as an animal or a plant. To be more specific, bit-map images representing the growth processes of a plant character for example are stored in the ROM in the electronic notepad. The plant character according to the degree of growth is displayed on the LCD of the electronic notepad and, at the same time, characters representing plant growing elements (water, light, and fertilizer for example) are displayed. Necessary amounts of these growing elements are inputted by operating corresponding keys on the electronic notepad. The inputted values are set to a water-amount indicating register, a light-amount indicating register, and a fertilizer-amount indicating register respectively in the RAM of the electronic notepad. Based on the values set to these registers, a new degree of growth is computed. Then, the plant character corresponding to the computed degree of growth is read from the ROM to be displayed on the LCD. Thus, the plant growth process according to the state of cultivation by the user is displayed.

For the means of communication between users in a virtual reality space, so-called chat is available. However, chat is carried out only by users accessing a virtual reality space at the same time. Therefore, the other users have no communication means in the virtual reality space.

SUMMARY OF THE INVENTION

It is therefore an object of the present invention to provide an information processing apparatus, an information processing method, and an information providing medium that provide a communication means for users who are not accessing a shared virtual reality space at the same time by passing a calling card of one of these users to a virtual reality life object reared by another.

In carrying out the invention and according to a first aspect thereof, there is provided an information processing method for an information processing apparatus to be provided with a shared virtual reality space from a server through a network along with another information processing apparatus, comprising steps of: instructing an object related to a user in the shared virtual reality space to obtain predetermined information arranged in the shared virtual reality space; and receiving the predetermined information from the object.

In carrying out the invention and according to a second aspect thereof, there is provided an information processing apparatus connected to a server through a network to be provided with a shared virtual reality space along with another information processing apparatus, comprising: instructing means for generating instructing information for instructing an object related to a user in the shared virtual reality space to obtain predetermined information arranged in the shared virtual reality space; and receiving means for receiving the predetermined information from the object.

In carrying out the invention and according to a third aspect thereof, there is provided an information providing medium for providing control information allowing an information processing apparatus connected to a server through a network along with another information processing apparatus to be provided with a shared virtual reality space from the server, the control information comprising steps of: instructing means for generating instructing information for instructing an object related to a user in the shared virtual reality space to obtain predetermined information arranged in the shared virtual reality space; and receiving means for receiving the predetermined information from the object.

In carrying out the invention and according to a fourth aspect thereof, there is provided an information processing method for providing a shared virtual reality space to a plurality of client apparatuses through a network, comprising steps of: controlling an autonomous behavior of an object existing in the shared virtual reality space; and transferring information obtained by the object in the shared virtual reality space to a user related to the object.

In carrying out the invention and according to a fifth aspect thereof, there is provided an information processing apparatus for providing a shared virtual reality space to a plurality of clients interconnected through a network, comprising: control means for controlling an autonomous behavior of an object existing in the shared virtual reality space; and transfer means for transferring information obtained by the object in the shared virtual reality space to a user related to the object.

In carrying out the invention and according to a sixth aspect thereof, there is provided an information providing medium for providing control information for providing a shared virtual reality space to a plurality of client apparatus through a network, comprising steps of: controlling an autonomous behavior of an object existing in the shared virtual reality space; and transferring information obtained by the object in the shared virtual reality space to a user related to the object.

BRIEF DESCRIPTION OF THE DRAWINGS

These and other objects of the invention will be seen by reference to the description, taken in connection with the accompanying drawing, in which:

FIG. 2 is a diagram illustrating a routing;

FIG. 8 is a diagram illustrating an example of a growth parameter control table;

DETAILED DESCRIPTION OF PREFERRED EMBODIMENTS

Figure 1:
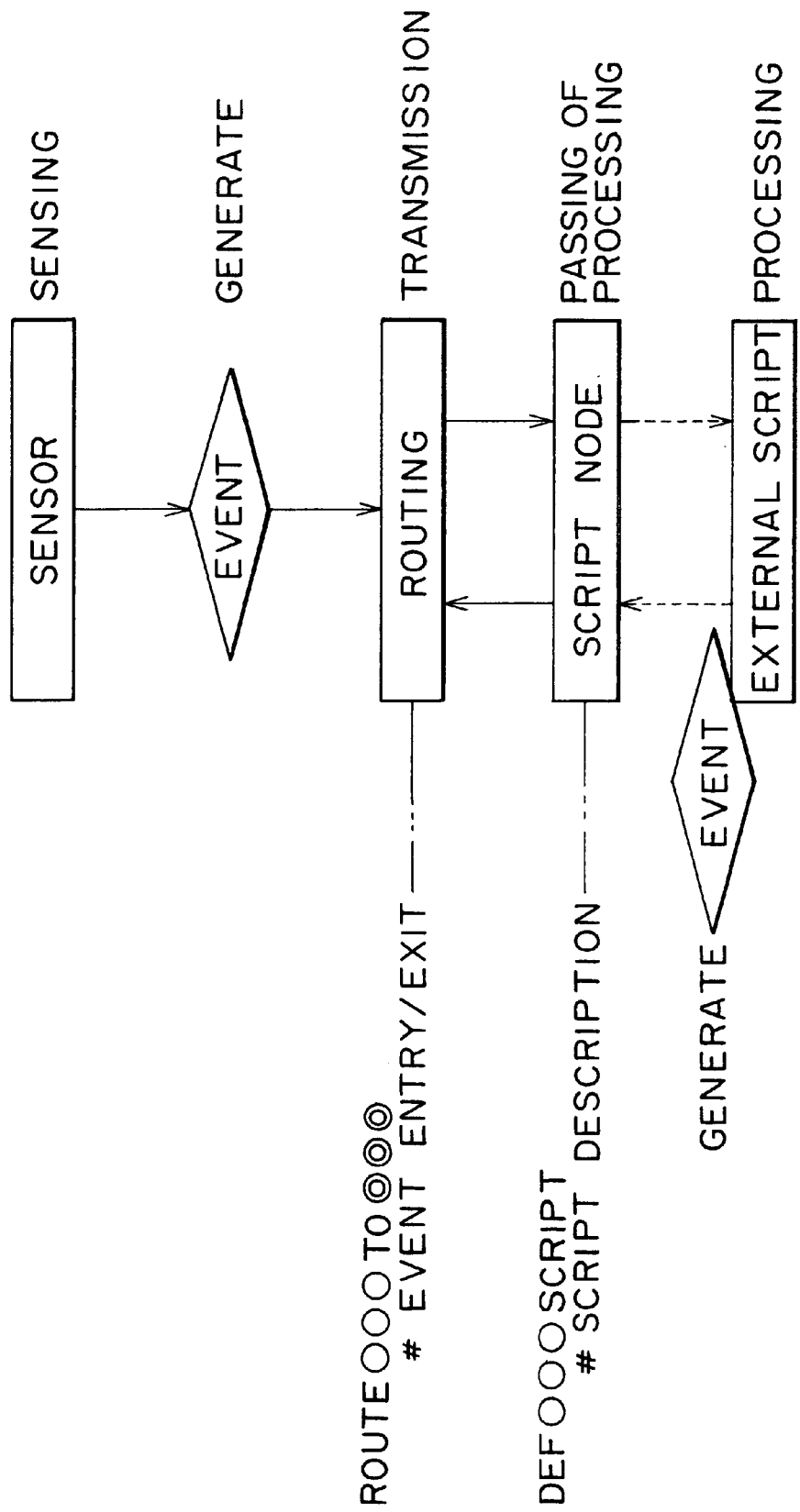
FIG. 1 is a diagram illustrating a relationship between a sensor, an event, a routing, and a script.

This invention will be described in further detail by way of example with reference to the accompanying drawings.

First, there will be described VRML (Virtual Reality Modeling Language), which is a descriptive language enabling users to integrally handle three-dimensional information by use of the framework of the WWW (World Wide Web) for providing a variety of information through the Internet, a computer network built worldwide.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP daemon and an HTML file in which hyper text information is stored. The wording "daemon" means a program for executing management and processing in the background upon working on UNIX. The hyper text information is described in a description language called HTML (Hyper Text Makeup Language). In the description of a hypertext by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP (Transmission Control Protocol/Internet Protocol) network is HTTP. This protocol has a capability of transferring a request for information from a client to the WWW server and the requested hyper text information stored in the HTML file to the client.

Used by many as an environment for using the WWW is client software such as Netscape Navigator (trademark of Netscape Communications Corp.) called a WWW browser.

Use of the WWW browser allows users to browse files, which are called home pages, corresponding to URLs stored in WWW servers on the Internet built worldwide, thereby performing net-surfing by sequentially following home pages linked to each other to access a variety of WWW information sources.

Recently, a VRML browser has been developed by extending this WWW. The VRML browser displays a three-dimensional space described in a three-dimensional graphics language called VRML that enables description of a three-dimensional space and setting of hypertext links to objects drawn in three-dimensional graphics, thereby allowing users to follow these links to sequentially access WWW servers.

Details of VRML are described in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0, as well as "Most Recent Trend of VRML And CyberPassage," Koichi Matsuda and Yasuaki Honda, the bit Magazine, Kyoritsu Publishing, 1996, Vol. 28, No. 7, pp. 29–36, No. 8, pp. 57–65, No. 9, pp. 29–36, No. 10, pp. 49–58.

The authorized and complete specifications of the Virtual Reality Modeling Language Version 2.0, ISO/IEC CD 14772 released on Aug. 4, 1996 is made public via HTTP at URL webspace.sgi.com/moving-worlds/spec/index.html and its Japanese version is made public using HTTP at URL www.webcity.co.jp/info/andoh/VRML/vrm12.0/spec-jp/index.html.

Further, for the browser for VRML 2.0 and the software for shared server, Sony Corporation, the present applicant, has developed and commercialized "Community Place Browser/Bureau (registered trademark)", a beta version of which is downloadable from the Internet home page of Sony, using HTTP at URL vx.sony.co.jp.

To build a three-dimensional space by use of VRML 2.0, a VRML file for representing a desired content is created by generating graphics data indicative of the shape and behavior of an object (or a model) in the virtual reality space by use of VRML (model creation), adding the model in the virtual reality space displayed on the screen to a switch (or a sensor) for generating an event when the user clicks the model with the mouse for example, programming (or scripting) a script for realizing an event to be generated when the sensor is pointed, and relating (or routing) between graphics data and script (hereafter, common nodes such as write specified in graphics data, script, and VRML are also generically referred to as nodes) such as operating the sensor and starting the script.

For example, using HTTP, the URL www.ses.co.jp/SES/STAFF/kan/howto/howtol.html describes in detail a method of writing VRML 2.0 and provides sample data.

The following describes a mechanism for implementing an autonomous behavior in a VRML space, a new feature provided by VRML 2.0, not supported by VRML 1.0.

VRML 2.0 data is constituted by a node and a field, which is basically written as follows:

Node {Field(s)}

In the above-mentioned file syntax, "Field(s)" may be omitted but "Node" and the braces "{","}" cannot. A field passes a variable to a node to specify a node parameter. If the field is omitted, a default is used. There are two types of fields. A single-value field (SF) having only one value and a multiple-value field (MF) having two or more values. Each single-value field begins with "SF" and each multiple-value field begins with "MF."

VRML 2.0 realizes an autonomous movement (behavior) of an object according to an event to be caused by an operation performed on the object arranged in a three-dimensional virtual reality space and a timer event that occurs when a preset time has been reached. The mechanism of this Behavior is realized by the cooperation of three elements; sensor, routing, and script as follows.

(1) A sensor node described as a VRML file related to a node such as an object arranged in a three-dimensional virtual reality space beforehand senses an external event based on a change in its field value to generate an event in a VRML scene.

(2) The generated event is transmitted to an external script, which is a program for specifying the behavior of the object based on a routing described as a VRML file.

(3) The external script describes beforehand a method to be called when a particular event is received. The external script, which has received the event transmitted by the routing, executes the processing based on the description and then changes the value of the field of the corresponding node in the VRML scene based on the result of the processing and the description of the routing.

For sensor nodes, the VRML 2.0 defines TouchSensor that causes an event when the pointing device passes over a specified object or the same is clicked by the user, ProximitySensor that causes an event when ViewPoint (of the user) enters a specified region, and TimeSensor that is caused every time a preset time interval elapses, for example.

The following describes the mechanism of Behavior in more detail. As described above, the mechanism of Behavior is implemented by a sensor, an event, a routing, and a script.

The sensor is functionally divided into the following two types:

the type for sensing a user operation; and the type for sensing a system change.

The sensor for sensing a user operation provides a software switch related to an object arranged in a three-dimensional virtual reality space. The sensor for sensing a system change starts a timer preset to a start time. These sensors sense these external events and convert them into events inside VRML.

The event indicates data for transmitting information between associated nodes in VRML. Actually, a change in a field value described in a VRML file is transmitted as an event.

The routing is a mechanism for specifying to which node an event sensed by the sensor capability is to be transmitted. Actually, the routing specifies a path of information transmission by the event.

The script provides an input/output port, performs some computation from an inputted event, and outputs a result of the computation. The script is not restricted to a particular language. In the current stage, the script can be written in Java (registered trademarks of Sun Microsystems, Inc. of US) and JavaScript noticed in the Internet, C language widely used in ordinary systems, Tcl/Tk and PERL widely used in UNIX, or Visual Basic provided by Microsoft Corporation of US. Thus, VRML 2.0 does not depend on a particular script language (in the course of defining VRML 2.0 specifications, employment of VRMLScript as particular language specifications was discussed but this idea was eventually discarded).

The following describes the processing means of Behavior with reference to FIG. 1. The processing by Behavior is diagramatically represented as shown in FIG. 1. The following describes flows of processing signals.

(1) Sensor Node

As described above, the sensor node is largely classified into two types; a sensor for sensing a user operation and a sensor for sensing a system change.

The sensor for sensing a user operation has sensor nodes such as TouchSensor and PlaneSensor for sensing a mouse click on a three-dimensional object and passing of a pointing device over a plane of the three-dimensional object. The sensor for sensing a system change has TimeSensor adapted to generate an event when a preset time has been reached.

In the example of FIG. 1, it is assumed that TouchSensor is attached to a sphere. When an user clicks the sphere, this event is sensed by TouchSensor. This event is sensed because the field value of the eventOut field of TouchSensor changes. Generally, one mouse click operation generates two events; namely, the timing of pressing the mouse button and the timing of releasing the mouse button.

Then, this event is routed by the routing description part.

(2) Routing

"Route" as shown in FIG. 2 specifies routing of this event.

When an event caused in the sensor description part is transmitted to the eventOut field of the Route and then to a script node to be described below, the event is passed to the external file, upon which the Behavior capability is executed.

(3) Script Node

This is a node for mediating the interlocking between a VRML file and an external script. This node specifies the language in which the description is made and a file name according to the description format of the script node, and the eventIn field and the eventOut field in order to give and take the event to and from the external script file. Available script files include those written in Java, JavaScript, C language, Tcl/Tk, PERL, and Visual Basic.

In actual processing, the processing is transmitted to the script file in which the routed event is described in the script node and the external script file is executed. The external script file is received through eventIn (event entrance) defined in it and the processing described in that file is executed. When this processing has come to an end, the processing result is returned through eventOut (event exit) to the routing of the VRML file. The VRML file executes this returned result, upon which the series of Behavior processing operations come to an end.

Use of the mechanism of Behavior to be realized by the above-mentioned cooperation between the sensor, the routing, and the script allows the user to dynamically change the external view (shape, attitude, size, color, and so on) or behavioral sequence for example of an object arranged in a three-dimensional virtual reality space by clicking an object resembling a switch also arranged in this space.

Details of the Behavior mechanism is disclosed in Section 4 "Concept" in the Specifications "The Virtual Reality Modeling Language Version 2.0," ISO/IEC CD 14772, Aug. 4, 1996 which is made public on the WWW via HTTP at URL webspace.sgi.com/moving-worlds/spec/part1/concepts.html and its Japanese version at www.webcity.co.jp/info/andoh/VRML/vrm12.0/spec-jp/part1/concepts.html. This section describes the key concepts to use of the VRML specifications. These concepts include various general node-related items such as a method of linking a node to a scene graph, a method in which a node generates or receives an event, a method of generating a node type by a prototype, a method in which a node type is added to VRML and then exported to be made available from outside, and a method of incorporating a script to operate as a program into a VRML file.

The following describes a technology in which, by application of the mechanism for realizing the above-mentioned autonomous movement (Behavior) of VRML 2.0, a virtual reality life object is created in a shared virtual reality space, growth parameters (external growth or internal growth (personality)) that change according to the generation of an event such as a user operation or passing of a predetermined time are controlled by a server, and a script program for dynamically changing one or both of the external view (shape, attitude, size, color, and so on) and the behavioral sequence of the created virtual reality life object based on the growth parameters transferred from this server is interpreted and executed, thereby displaying the virtual reality life object according to the growth parameters.

Figure 3:
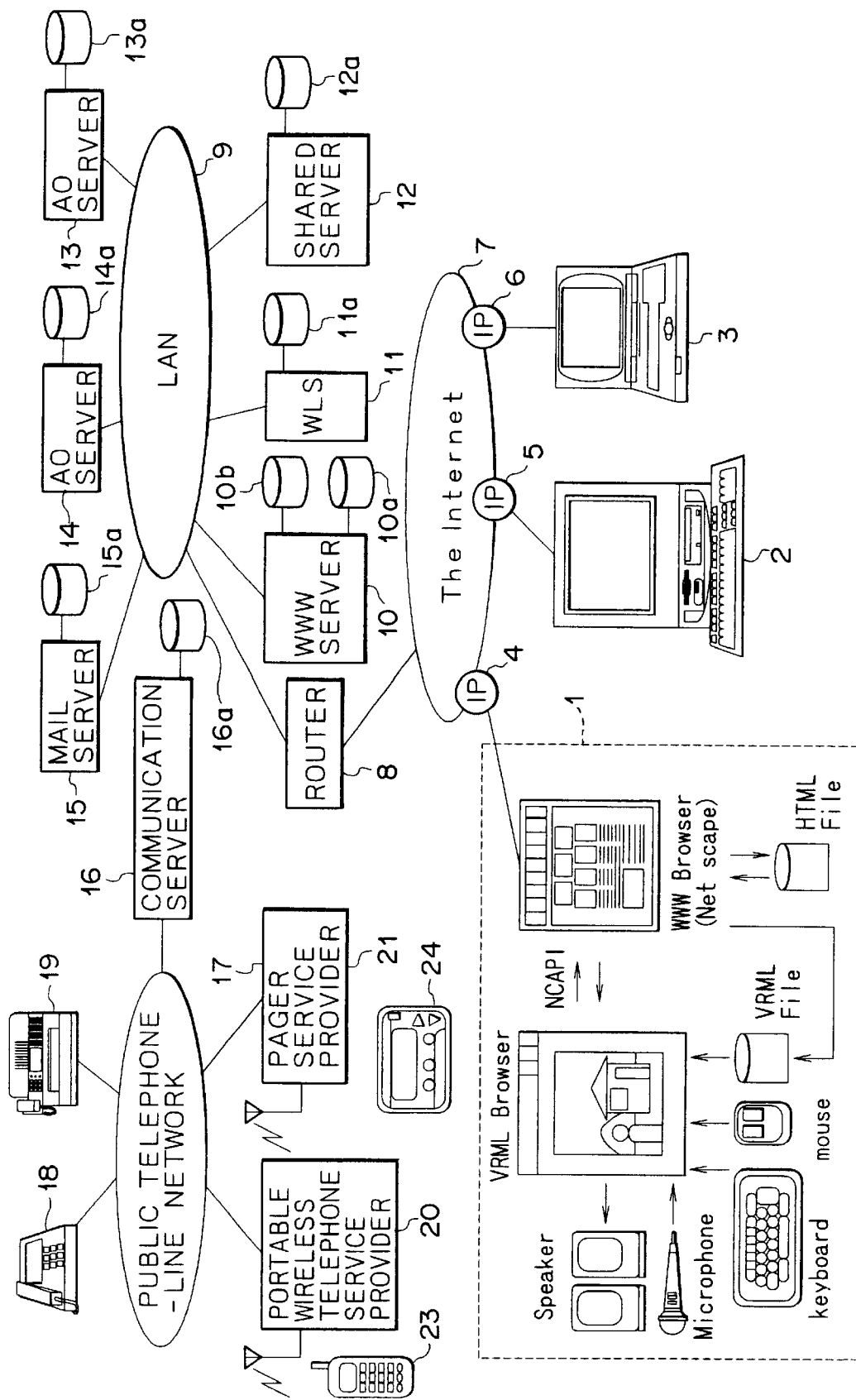
FIG. 3 is a block diagram illustrating an example of a constitution of a shared virtual reality space providing system associated with the present invention.

FIG. 3 is a schematic diagram illustrating an entire system practiced as one preferred embodiment of the present invention.

In FIG. 3, a VRML browser and a WWW browser are installed in client PCs (Personal Computers) 1 through 3, which are connected to the Internet 7 through IPs (Internet Service Provider) 4 through 6.

A LAN (Local Area Network) 9 connected to the Internet 7 through a router 8 is connected to a WWW server 10, a WLS (World Location Server) 11, a shared server 12, AO (Application Object) servers 13 and 14, a mail server 15, and a communication server 16. The WWW server is provided with hard disk (HDD) 10a and 10b, the WLS server 11 with a hard disk 11a, the shared server 12 with a hard disk 12a, the AO server 13 with a hard disk 13a, the AO server 14 with a hard disk 14a, the mail server 15 with a hard disk 15a, and the communication server 16 with a hard disk 16a.

The communication server 16 is connected to a telephone 18 and a facsimile 19 through a public telephone network 17, to a portable telephone terminal 23 through a wireless telephone service provider 20 in a wireless manner, and to a paging terminal 24 through a paging service provider 21 in a wireless manner.

Figure 4:
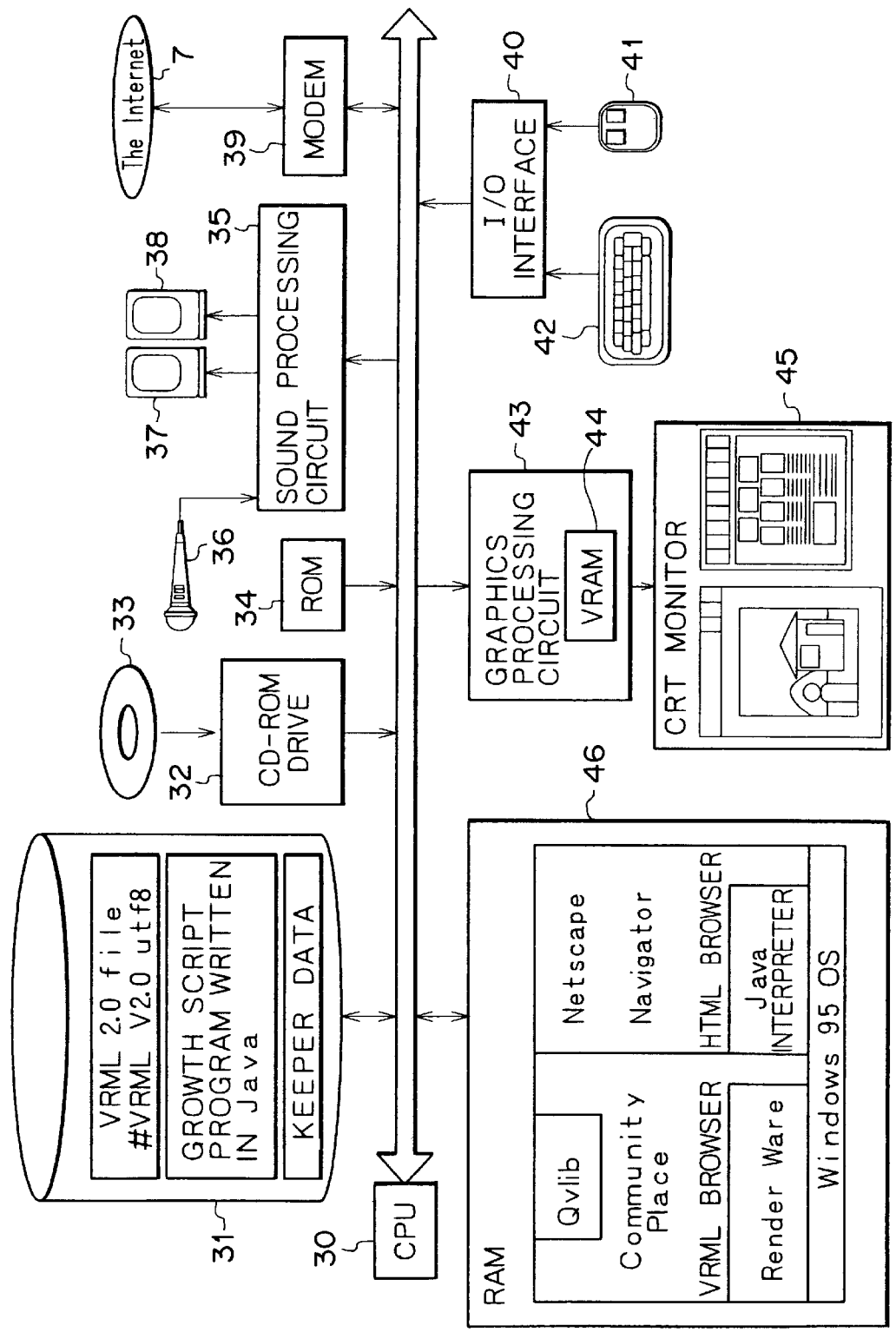
FIG. 4 is a block diagram illustrating an example of a constitution of the client PC 1 shown in FIG. 1.

The following describes a hardware constitution of the client PC 1 with reference to FIG. 4.

In FIG. 4, a CPU (Central Processing Unit) 30 of the client PC1 controls the other components of this client PC. A hard disk drive (HDD) 31 stores VRML contents composed of a VRML 2.0 file and a growth script program for a shared virtual reality life by Java (registered trademark of Sun Microsystems, Inc. of US), and data about the keeper of the virtual reality creature. A CD-ROM drive 32 reads VRML contents stored in a CD-ROM disc 33. A ROM 34 stores a BIOS (Basic Input/Output System) and so on. A sound processor 35 is connected to a microphone 36 and left and right speakers 37 and 38. A MODEM 39 connects this client PC to the Internet 7. An I/O (Input/Output) interface 40 is connected to a mouse 41 and a keyboard 42. A graphics processor 43 incorporates a VRAM (Video RAM) 44. A CRT monitor 45 displays an image signal outputted from the graphics processor 43. A RAM 46 stores various computer programs.

In the RAM 46, Netscape Navigator, which is a WWW browser operating on Windows 95 (registered trademark of Microsoft Corporation of US), the Java interpreter, and Community Place Browser, which is a VRML 2.0 browser developed by Sony Corporation, are read at run time and are ready for execution by the CPU 30.

The VRML 2.0 browser is installed with QvLib, which is a VRML syntax interpreting library (parser) developed by Silicon Graphics, Inc. in US and offered without charge, RenderWare, which is a software renderer developed by Criterion Software Ltd. in England, and so on or other parser and renderer having equivalent capabilities.

As shown in FIG. 3, Community Place Browser transfers data of various types with Netscape Navigator, a WWW browser, based on NCAPI (Netscape Client Application Programming Interface) (registered trademark).

Receiving an HTML file and VRML content (including a VRML file and a script program written in Java) from the WWW server 10 through the Internet 7, Netscape Navigator stores them in the local HDD (Hard Disk Drive) 31. Netscape Navigator processes the HTML file to display text and images on the CRT monitor. On the other hand, Community Place Browser processes the VRML file to display a three-dimensional virtual reality space on the CRT monitor and changes the behavior of the object in the three-dimensional virtual reality space according to the result of processing of the script program by the Java interpreter.

It should be noted that the other client PCs 2 and 3 have generally the same constitutions, not shown, as that of the PC 1 described above.

The following describes the operation of the above-mentioned preferred embodiment.

First, a sequence spanning from actually downloading the VRML content through the Internet to providing a multi-user environment in which one virtual reality space is shared by plural users is described with reference to FIGS. 5 through 7.

Figure 5:
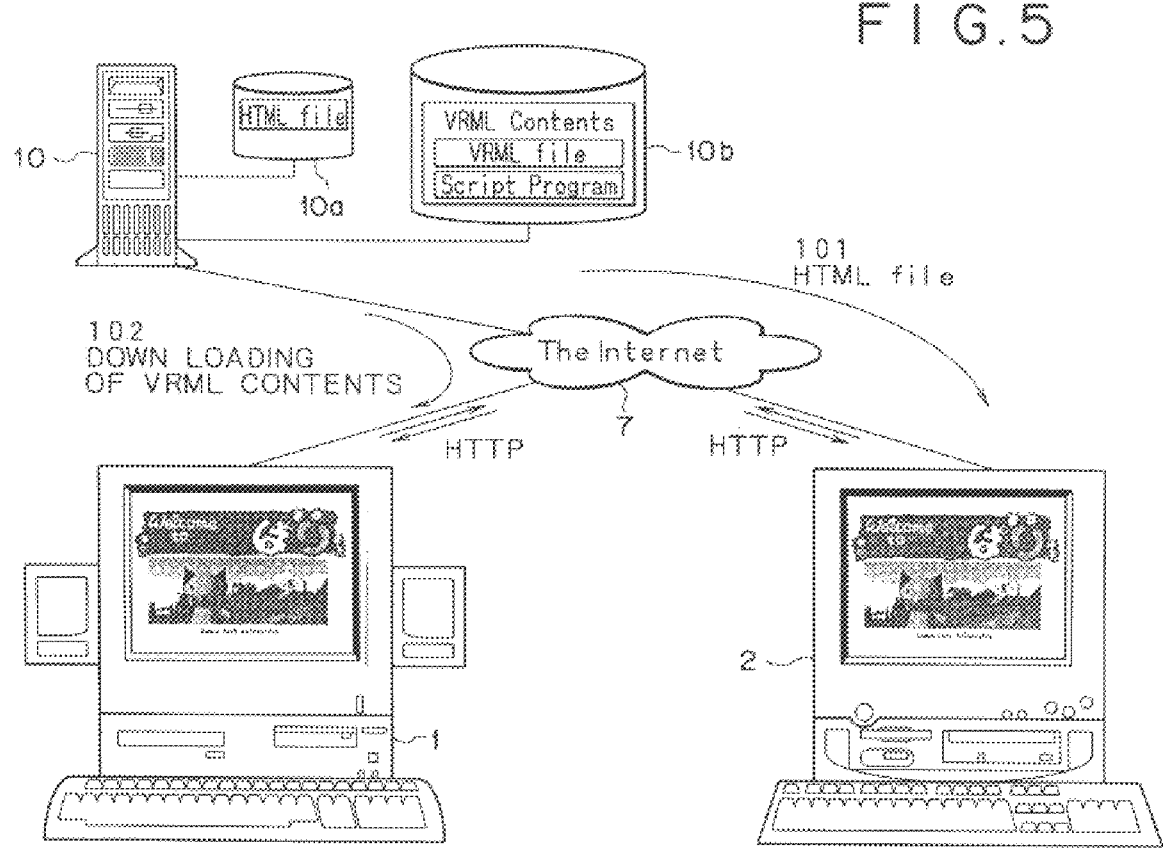
FIG. 5 shows display photographs for describing an operation of the system shown in FIG. 3.

Referring to FIG. 5, the home page of the Web site that provides the VRML content is browsed by the use of the WWW browser as indicated by arrow 101. In this example, using HTTP, the home page at pc.sony.co.jp/sapari/ is browsed. Next, as indicated by arrow 102, the users of the client PC 1 and the client PC 2 download the VRML content composed of the VRML 2.0 file and the script program (the growth script program written in JAVA) for realizing an autonomous movement (Behavior) in the VRML space.

Obviously, the VRML content provided in the CD-ROM disc 33 may be read by the CD-ROM drive 32.

Figure 6:
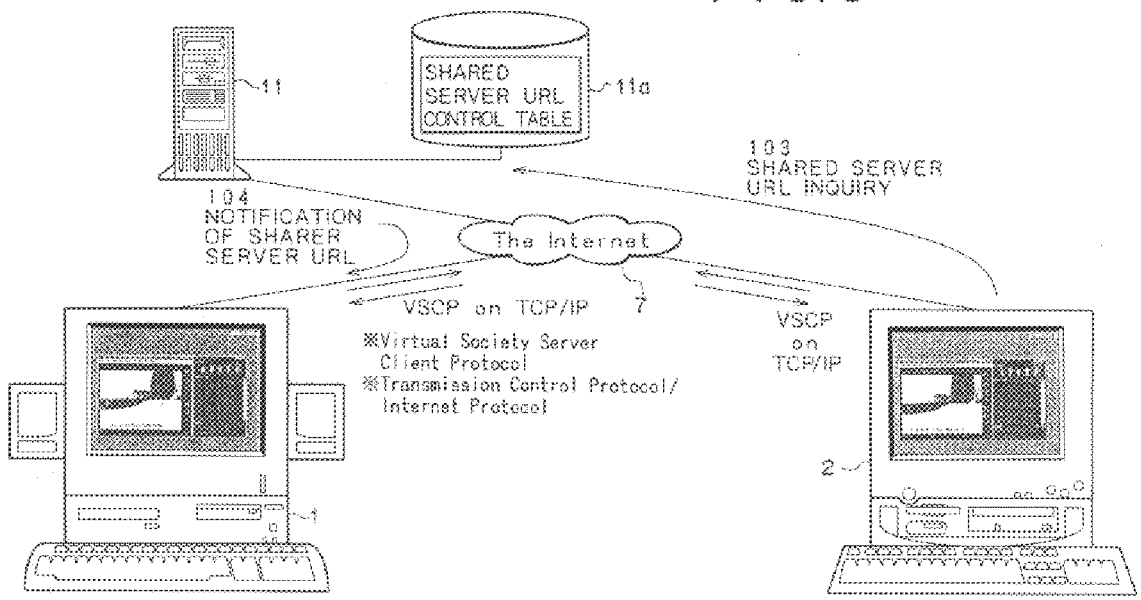
FIG. 6 shows display photographs for describing another operation of the system shown in FIG. 3.

Then, as shown in FIG. 6, in the client PC 1 and the client PC 2, the VRML 2.0 file downloaded and stored in the local HDD 31 is interpreted and executed by Community Place Browser, which is a VRML 2.0 browser. Next, as indicated by arrow 103, the client PCs ask the WLS 11 for the URL of the shared server 12 based on VSCP (Virtual Society Server Client Protocol). In response, as indicated by arrow 104, the WLS 11 references the shared server URL control table stored in the HDD 11a and sends the URL of the shared server 12 to the client PC 1 and the client PC 2.

Figure 7:
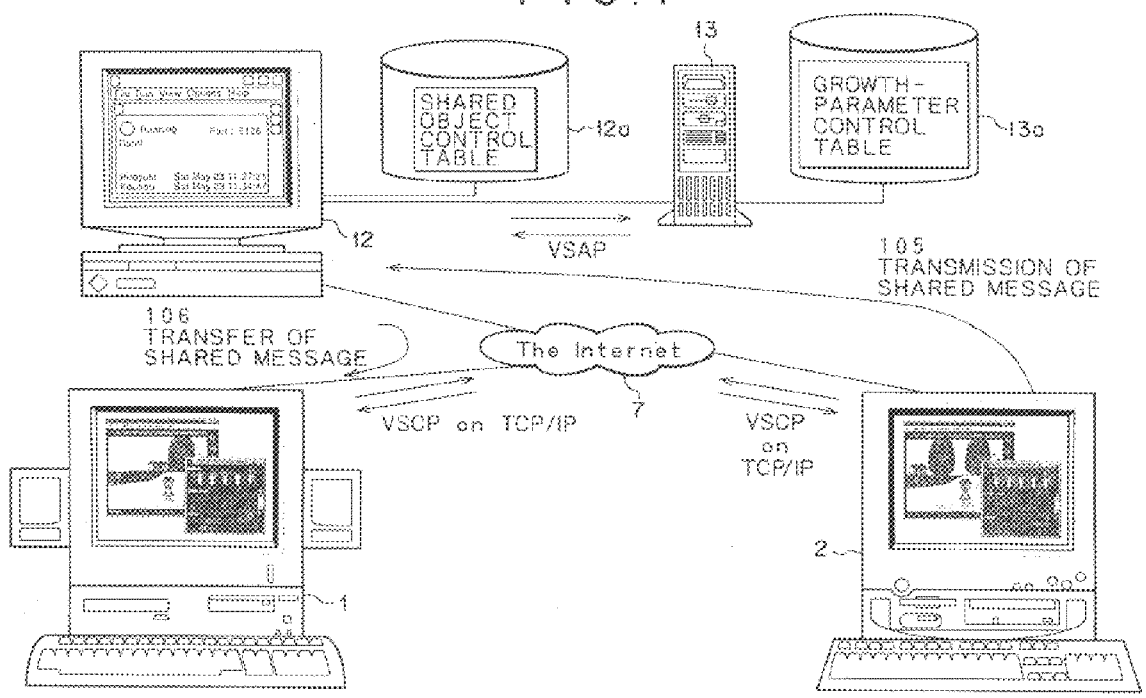
FIG. 7 shows display photographs for describing another operation of the system shown in FIG. 3.

Using this URL, the client PC 1 and the client PC 2 are connected to the shared server 12 as shown in FIG. 7. As a result, as shown with arrow 105, shared messages associated with the position and movement of the shared 3D object are transmitted through this shared server 12. These messages are transferred as shown with arrow 106 to realize the multi-user environment.

For detailed description of the procedure of the above-mentioned connection, refer to Japanese Patent Laid-open No. Hei 9-81781 corresponding to U.S. patent application Ser. No. 08/678,340.

The following describes the AO server 13 that controls the behavior of a virtual reality life object existing in the shared virtual reality space. The AO server 13 transfers data associated with the virtual reality life object with the shared server 12 based on VSAP (Virtual Society Server Application Protocol). The HDD 13a of the AO server stores a growth parameter control table for the virtual reality life object as shown in FIG. 7.

Only one universal object exists in a virtual reality space, which is an AO covering the entire virtual reality space. The universal object can monitor the login and logout of all users.

A virtual reality object is an object other than a virtual reality life object left (or placed) in a virtual reality space. When a virtual reality object is picked up by a user, the picked up virtual reality object is controlled as a possession of that user.

FIG. 8 shows the growth parameter control table. It should be noted that the data associated with the virtual reality life object are largely classified into virtual reality life data and keeper data.

The virtual reality life data includes a 3D object ID for uniquely identifying a 3D object in one shared virtual reality space, three-dimensional coordinate values representing the virtual reality life object in the shared virtual reality space, a type of a creature such as a monkey or a cat selected by the keeper, the gender of the creature, its nickname given by the keeper, a date initialized by the keeper, namely the birth date of the virtual reality life object, a world name (a world name of domicile of origin) given to the virtual reality space in which the virtual reality life object was born, and growth parameters of the virtual reality life object.

The growth parameters are largely classified into physical parameters for specifying the external growth of the virtual reality life object and mental parameters for specifying the internal growth of the avatar reflecting its character.

The physical parameters are composed of height (in centimeters), weight (in kilograms), physique index, appetite index, health index, and remaining life time (in hours).

The mental parameters include intelligence quotient, language capability index, sociability index, independence index, activity index, and mood index.

These parameters are sequentially updated to values computed by a predetermined growth parameter computing equation based on a timer event caused when certain time has passed after the birth date initialized by the keeper, and an access event and an operation event caused by a call message and an operation message from the client PC.

Figure 9:
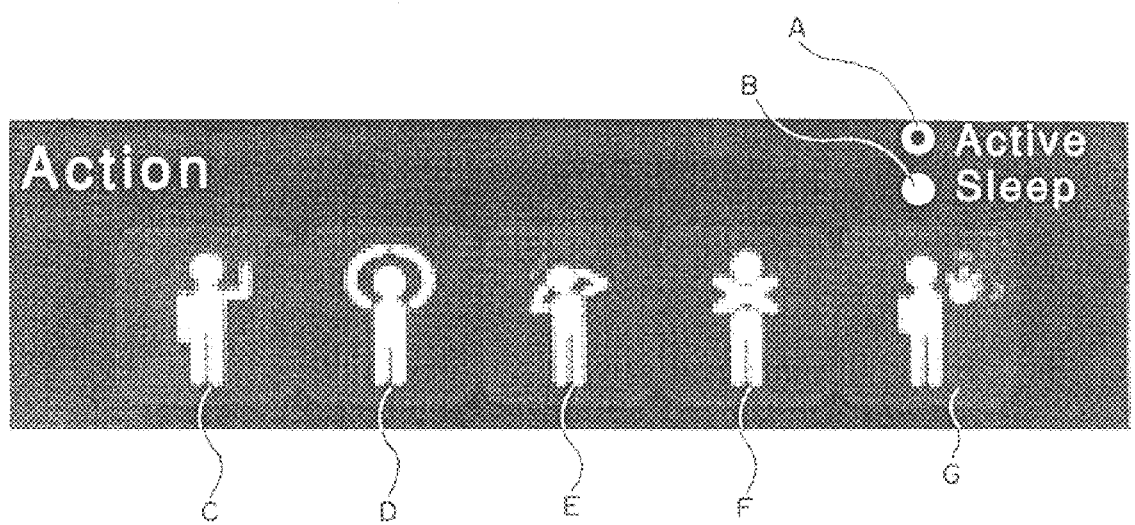
FIG. 9 shows a photograph for describing an action panel.

FIG. 9 shows capabilities of an action panel displayed beside the main window of the VRML browser on the CRT monitor screen 45 of the client PC 1.

In FIG. 9, "A" denotes a calling button represented as "Active." This button is clicked to call the virtual reality life object (hereafter also referred to as a virtual reality pet) or wake up the sleeping virtual reality pet.

"B" denotes a button represented as "Sleep" for putting the virtual reality pet to bed.

"C" denotes a feeding button. This button is clicked to feed the virtual reality pet.

"D" denotes a praise button. This button is clicked to praise the virtual reality pet by smiling at it.

"E" denotes a play button. This button is clicked to play tag, in which the keeper chases the virtual reality pet until the same is blocked by a wall and cannot be escaped therefrom.

"F" denotes a scold button. This button is clicked to scold the virtual reality pet for discipline.

"G" denotes a groom button. This button is clicked to groom the virtual reality pet by brushing.

Figure 10:
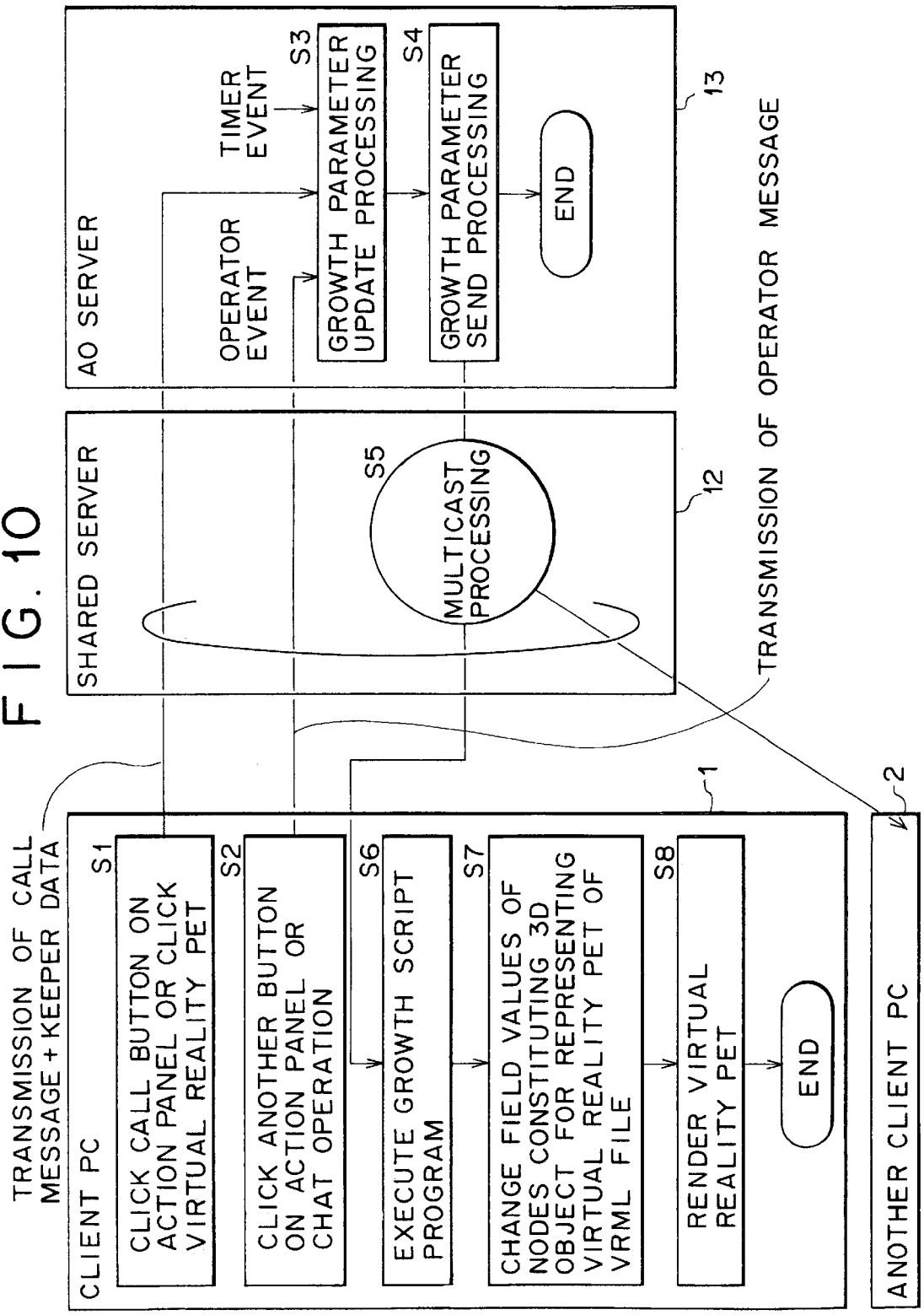
FIG. 10 is a diagram illustrating passing of a growth parameter.

As shown in FIG. 10 for example, when the call button A is clicked (the action panel is operated) on the own client PC 1 and a resultant call message is sent to the AO server 13 through the shared server 12 (step S1), growth parameter update processing is performed on the growth parameter control table based on that access event (step S3). Based on this access event, the appetite index, the health index, and the mood index are each incremented by 0.1 point from $1/10$ to $10/10$.

If the feeding button C is clicked for example and a resultant message is sent to the AO server 13 (step S2), the weight of the growth parameter increase every time the operation event occurs, along which the physique index is incremented by 0.1 point from $1/10$ to $10/10$ (step S3).

Then, when the timer event occurs as a result of passing of a predetermined time, the weight, one of the growth parameters, decreases, decrementing the physique index by 0.1 point (step S3).

For example, the growth parameters including this physique index are transferred (step S4) to the client PC 1 of the original keeper and another client PC 2 sharing the virtual reality space by multicast processing (step S5) of the shared server 12 every time the growth parameters are updated.

The client PC 1 executes the growth script program described with a processing procedure for controlling the autonomous behavior resulted from the virtual reality pet growth based on the growth parameters (step S6), changes the field values of the nodes constituting the 3D object for representing the virtual reality pet in the VRML file (step S7), performs rendering on the virtual reality pet on which the changed field values are reflected (step S8), and displays the rendered virtual reality pet on the main window of the VRML browser on the CRT monitor screen 45 of the client PC 1.

The same processing performed by the client PC 1 is also performed on the other client PC 2 sharing the virtual reality space. Consequently, rendering is performed on the appearance of the virtual reality pet on which the field value changed along the growth of the virtual reality pet is reflected, and the rendered virtual reality pet is also displayed on the main window of the VRML browser on the CRT monitor of the other client PC 2.

Figure 11:
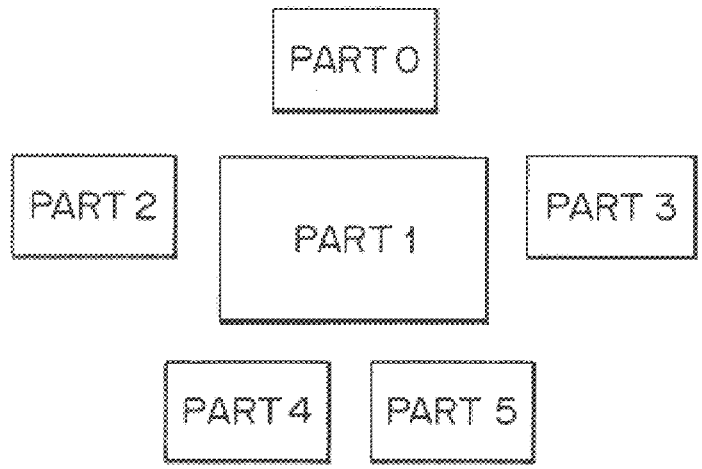
FIG. 11 is a diagram for describing virtual reality life object nodes constituting a 3D object.
Figure 12:
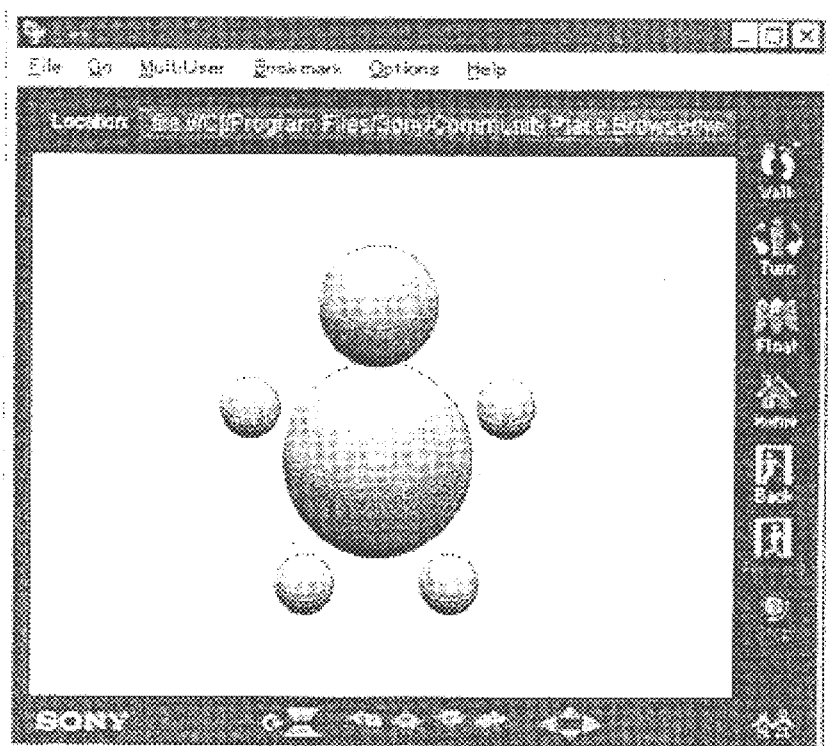
FIG. 12 shows a display photograph indicative of a display example corresponding to the nodes shown in FIG. 11.

FIG. 11 shows a relationship among part 0 through part 5 corresponding to the nodes constituting a 3D object for representing a virtual reality pet in the VRML file. FIG. 12 shows an example of displaying these parts. Part 0 corresponds to the head of the virtual reality pet, part 1 to its body, part 2 and part 3 to its right and left arms, and part 4 and part 5 to its right and left legs.

Changing the field values of the nodes corresponding to these parts 0 through 5 can dynamically change the external view (shape, attitude (orientation), size, color, and so on) and the behavioral sequence of each part of the virtual reality pet. These are all realized by the processing of the growth script program based on the growth parameters. Namely, these are realized by use of the mechanism of Behavior to be realized by the cooperative operation between the sensor, the routing, and the script defined in VRML 2.0.

Therefore, unlike the conventional method of displaying images of a virtual reality creature of portable electronic pet, it is unnecessary to store the bit-map images representing each growth process of the character of virtual reality creature in the ROM beforehand. Namely, use of the mechanism of Behavior can continuously and dynamically change the physique and behavior of a virtual reality pet according to its growth process for example.

Figure 13:
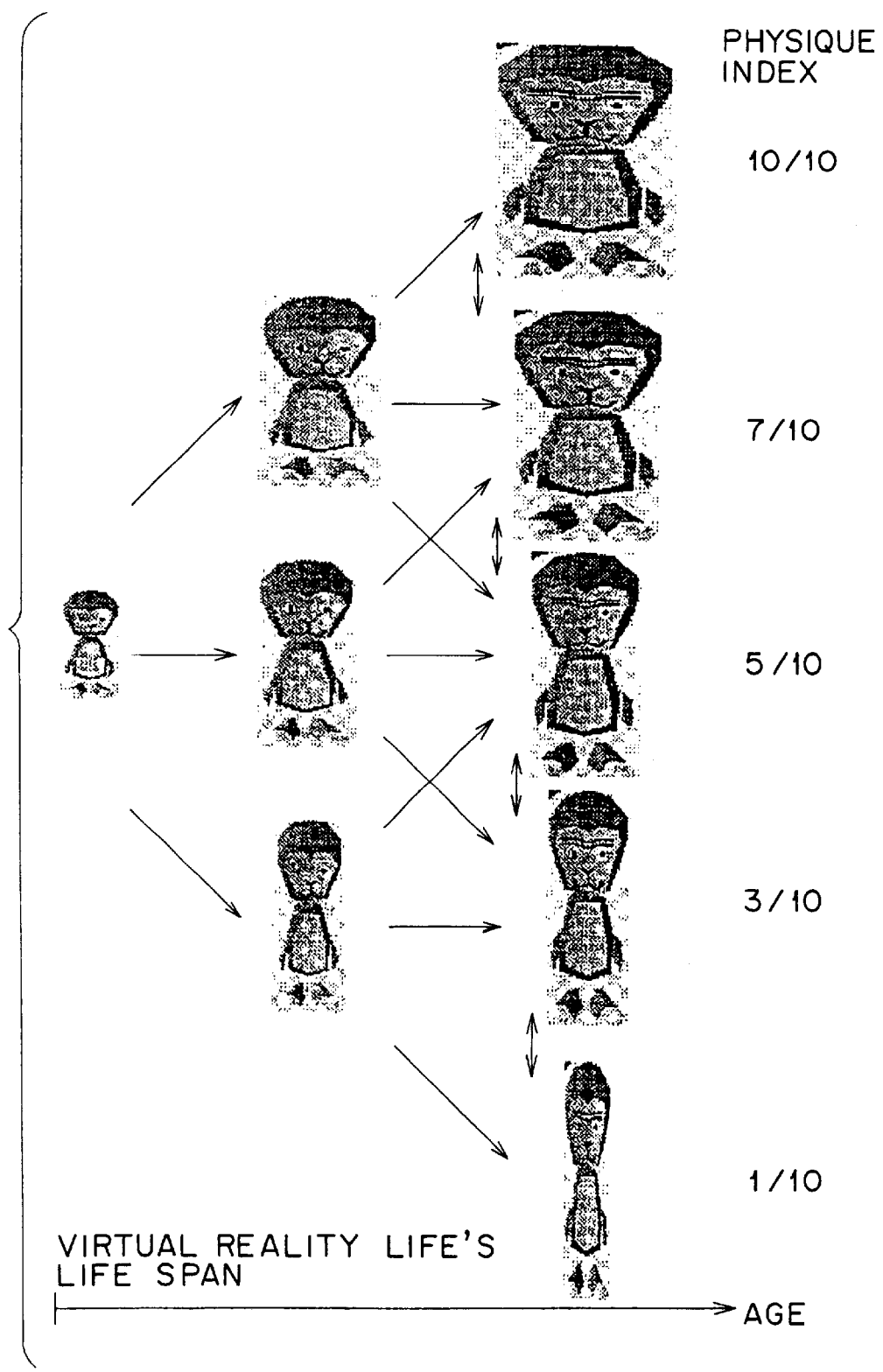
FIG. 13 is a diagram for describing virtual reality life object physique index.

FIG. 13 is a conceptual diagram in which the physique of a virtual reality pet is dynamically changed as the virtual reality pet grows and its physique index changes. As the virtual reality pet grows in age, its face becomes that of an adult and its physique becomes larger. If the physique index is small, the avatar becomes thin; if it is large, the avatar becomes thick.

Figure 14:
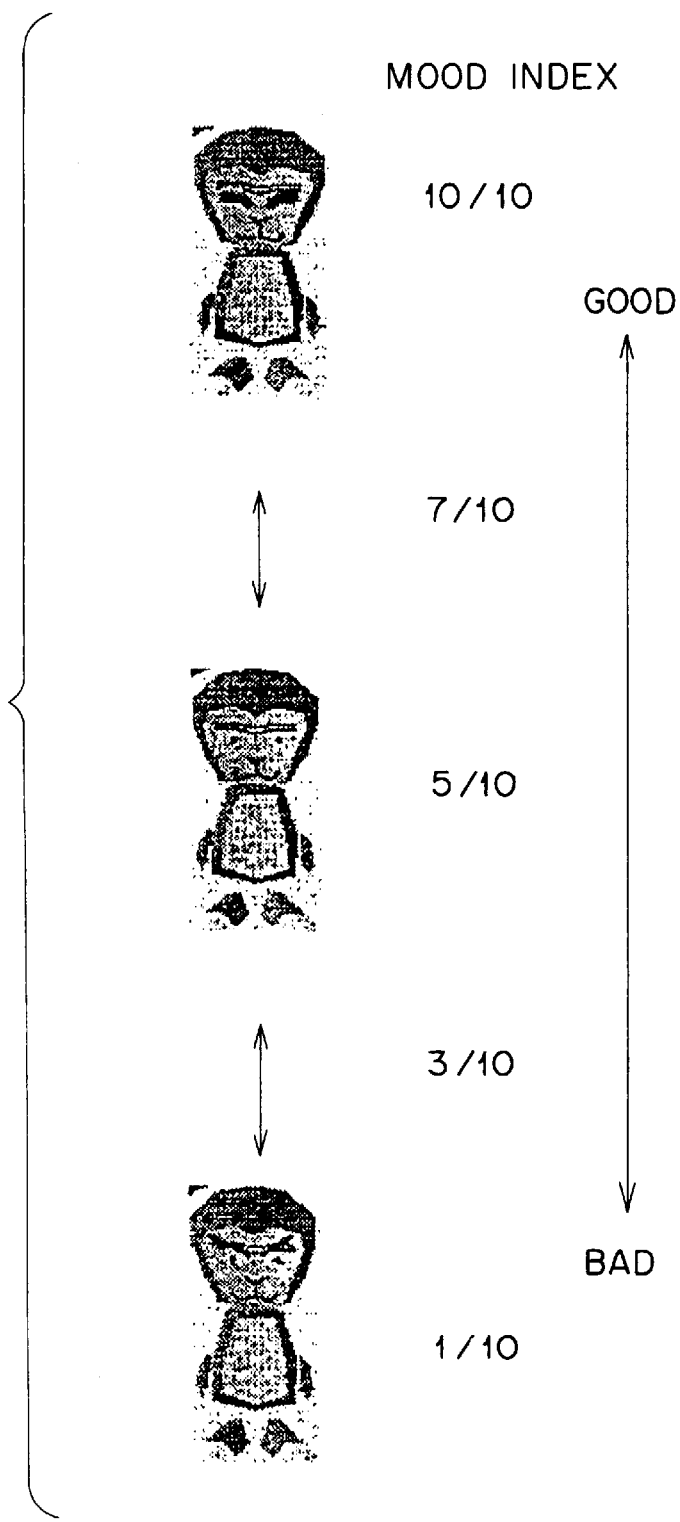
FIG. 14 is a diagram for describing virtual reality life object mood index.

FIG. 14 is a conceptual diagram in which the countenance of the virtual reality pet is dynamically changed as its mood index changes. When the mood index is high, the face of the virtual reality pet smiles; when it is low, an angry expression appears on the face.

Figure 15:
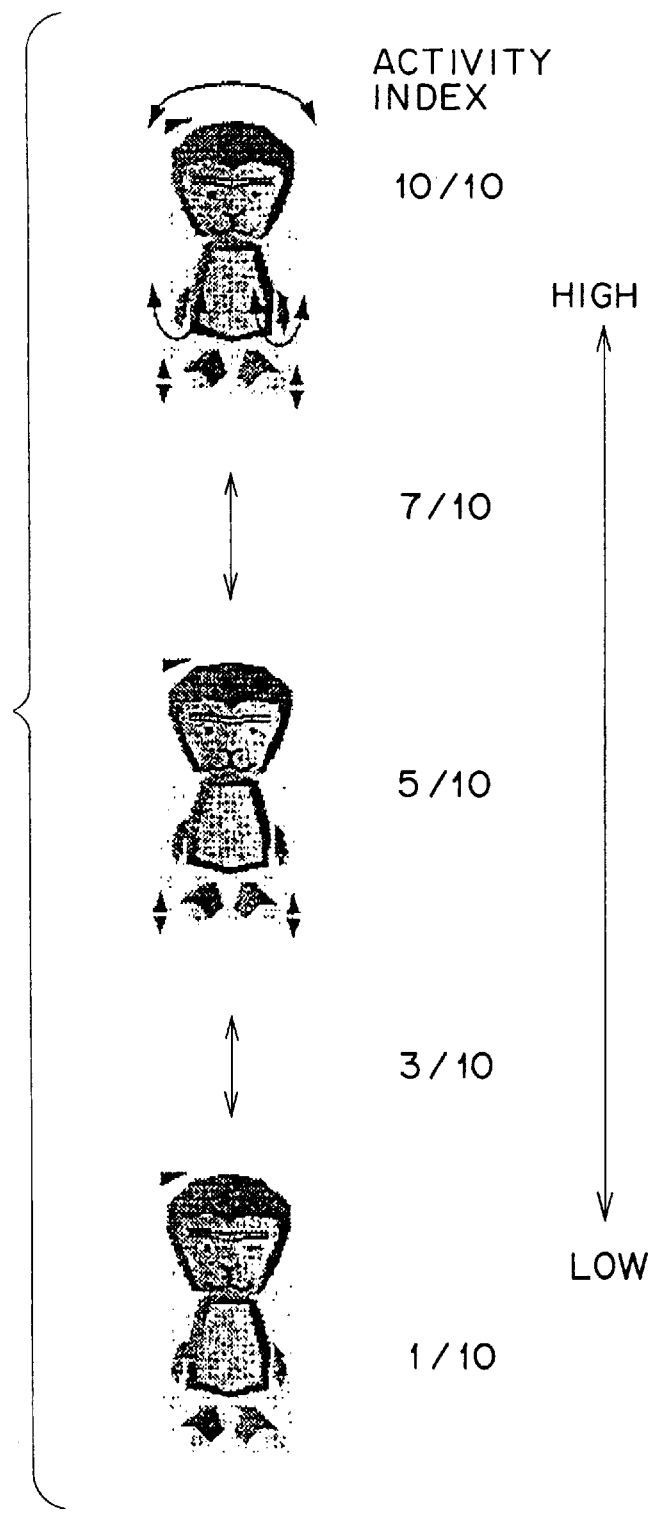
FIG. 15 is a diagram for describing virtual reality life object activity index.

FIG. 15 is a conceptual diagram in which the behavioral sequence of each part of the virtual reality pet is dynamically changed as the activity index of the virtual reality pet changes. When the activity index is low, only a small movement such as bending of knees; when it high, the virtual reality pet can wave its arms or shake its head for example.

Figure 16:
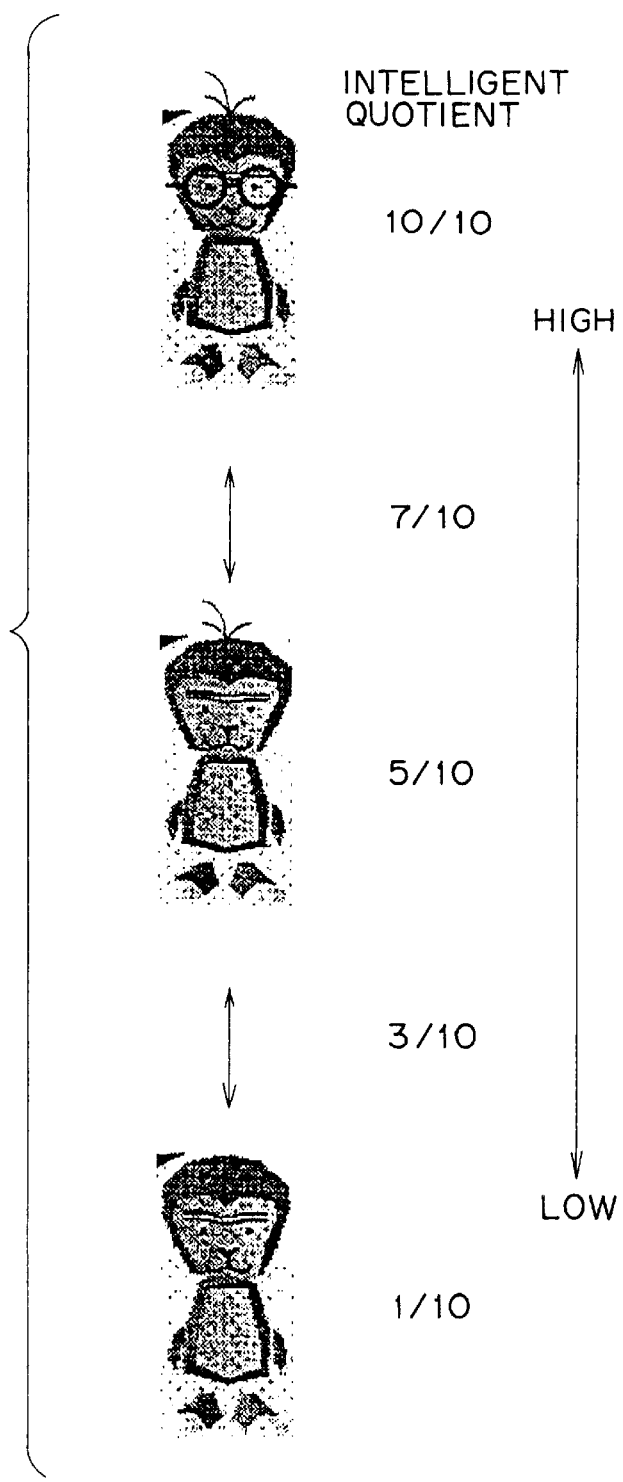
FIG. 16 is a diagram for describing virtual reality life object intelligent quotient.

FIG. 16 is a conceptual diagrams in which hair is added to the virtual reality pet or glasses are put on it as the intelligence quotient of the virtual reality pet changes.

The intelligence quotient, one of the growth parameters, is incremented by 0.1 point based on the access event caused by the operation of the calling button A shown in FIG. 9, thereby changing the appearance of the virtual reality pet as shown in FIG. 16.

The language index is incremented by 0.1 point according to the age of the virtual reality pet based on the access event caused by the operation of the call button A shown in FIG. 9 or the timer event, thereby changing the style of text in chat sentence editing processing. For example, chat of a virtual reality pet having a small point is performed using hiragana or katakana Japanese syllabary and a chat of a virtual reality pet having a large point is performed using text including kanji Chinese characters.

The sociability index is incremented or decremented by 0.1 point according to the frequency of chat with the keeper. If the frequency is high, sociability increases; if it is low, sociability decreases. A virtual reality pet having a sociable and positive character takes on good attitude and countenance. Conversely, a virtual reality pet having an introvert and negative character takes on poor attitude and countenance.

The independence index is incremented by 0.1 point as a virtual reality pet ages based on timer event, gradually becoming independent of the keeper, rejecting commands of the keeper for example.

The activity index is determined based on the age, appetite index, and health index, affecting the behavior of a virtual reality pet as shown in FIG. 15. Also, the activity index is incremented by 0.1 point based on the event caused by operating the play button E shown in FIG. 9, affecting the behavior of the virtual reality pet such as gradually quickening getaway. The weight of the virtual reality pet is decreased to decrement its physique index, dynamically changing its appearance as shown in FIG. 13.

The mood index is determined by the access event caused by operating the call button A shown in FIG. 9 and the access frequency based on timer event, thereby affecting the countenance of a virtual reality pet as shown in FIG. 14.

On the other hand, the keeper data in the growth parameter control table shown in FIG. 8 is composed of the name of the keeper, a means (or method) for making contact with the keeper, and the address of the contact.

If the contacting means is 0, contact to the keeper is performed by a message statement through electronic mailing via the Internet 7. If the contacting means is 1, contact to the keeper is performed by converting text data of a message statement into a voice by an automatic reading tool on the communication server 16 and inputting the voice into the analog telephone 18. If the contacting means is 2, contact to the keeper is performed by a message statement to the portable telephone terminal 23 by use of an electronic mail service based on the data transmission protocol of wireless communication. If the contacting means is 3, contact to the keeper is performed by a written document to the facsimile 19. If the contacting means is 4, contact to the keeper is performed by a message statement to the pager terminal 24.

The keeper data as described above is controlled to realize the capability of contacting the keeper by use of the existing communication infrastructure to be described later and the capability of simplified operation of a virtual reality pet by use of the existing communication infrastructure.

The above-mentioned system is summarized as follows. Namely, the growth parameter (indicative of outer growth or inner growth (personality)) of a virtual reality life object existing in a shared virtual reality space is controlled by the AO server 13, this growth parameter changing with occurrence of a predetermined event (an event caused by a user operation or passing of predetermined time). Based on the growth parameter transferred from the AO server 13, the script for dynamically changing one or both of the appearance (shape, attitude, size, or color) and the behavioral sequence of the virtual reality life object is interpreted to display the virtual reality life object according to the growth parameter on the client PCs 1 and 2.

The AO server 13 for controlling the autonomous behavior of a virtual reality life object existing in a shared virtual reality space is provided with a control table for controlling growth parameters for the virtual reality life object that change with occurrence of a predetermined event (an event caused by a user operation or passing of a predetermined time). A growth parameter read from the control table upon request from a client or occurrence of a predetermined demand is sent to one or both of the requesting client and another client.

As described above, the growth parameter is a value indicative of the degree of external growth to be calculated based on the occurrence of a predetermined event (an event caused by a user operation or passing of a predetermined time) from the birth of a virtual reality life object. Therefore, the outer growth parameter defines the outer change of a virtual reality life creature or a virtual reality pet (AO) according to the age from baby to grown-up to aged.

The growth parameter is also a value indicative of the degree of inner growth (character) to be calculated based on the occurrence of a predetermined event (a user operation or passing of a predetermined time) for a virtual reality life object. For example, a virtual reality life object having a sociable and positive character takes on good attitude and countenance. Conversely, a virtual reality life object having a dark and negative character takes on bad attitude and countenance. Thus, the change in the character of a virtual reality life creature or a virtual reality pet (AO) is specified by the inner growth parameter.

For the inner growth parameter, a different value is calculated according to the type of an event for a virtual reality life object, updating the degree of the inner growth. If the character of a virtual reality pet for example is controlled by the AO server 13, 0.1 point is added to a predetermined index of the growth parameter according to the type of a message sent from each client; for example, every time the virtual reality pet is talked to in chat. Every time, the virtual reality pet is praised by pressing of the praise button D, 0.2 point is added. Every time the virtual reality pet is scolded by pressing of the scold button F, 0.2 point is subtracted from the predetermined index. Thus, the calculation is performed based on predetermined arithmetic equations.

The AO server 13 for controlling the autonomous behavior of a virtual reality life object in a shared virtual reality space is provided with a growth parameter control table indicative of the degree of growth of each virtual reality life object. This control table holds the birth date of each virtual reality life object. Based on the elapsed time starting from this birth date, the growth parameter according to the age of each virtual reality life object is calculated. The control table is updated by the newly calculated growth parameter.

The autonomous behaviors of plural virtual reality life objects in a shared virtual reality space are independently controlled by the AO server 13 (the single AO server 13 may control plural growth parameter control tables or the AO server 13 and the AO server 14 may control the plural control tables separately). Thus, the growth parameter control tables indicative of the growth degrees of different virtual reality life objects may be provided separately to control the growth parameters of the different virtual reality life objects independently.

In addition, various applications such as described below for example are possible.

For example, the AO server 13 for controlling the autonomous behavior of a virtual reality life object in a shared virtual reality space may be provided with a control table for controlling the ID (a nickname for example of the virtual reality life object set by user) of a client who has accessed the virtual reality life object (the control items of this control table may be included in the growth parameter control table or this control table may be provided independently). Based on this control table, an event indicative of an intimacy emotional expression may be started according to the access by the client having this ID. Thus, holding the degree of intimacy (access count and contents) on the AO server 13 can realize a pet (virtual reality life) object that approaches its keeper when the keeper has entered the world (the shared virtual reality space).

The ID of a client who has set or reset a virtual reality life object may be stored in the growth parameter control table as the keeper of this virtual reality life object. Updating of this ID is disabled until the life of the virtual reality life object expires. At the time of the expiration, this ID may be deleted. This can realize a virtual reality pet that is loyal to its keeper who has given birth to it (namely set it in the shared virtual reality space). Further, when the life of a virtual reality life object expires (namely, it is reset), a child of this virtual reality life object may be automatically generated and the ID of the keeper of its parent may be set to this child. This makes the child pet be also loyal to the keeper of its ancestor.

The AO server 13 may be provided with a history control table for controlling the history of a client who has set or reset a virtual reality life object. The client higher in access frequency than other clients can start a behavioral sequence indicative of more intimate emotional expression. As the access frequency lowers, the degree of intimacy lowers, thereby realizing a whimsical pet of which degree of intimacy changes with access frequency.

If the movement of a virtual reality life object is controlled according to the position of client in a shared virtual reality space, the virtual reality life object immediately appears just in front of the client (keeper) when the client enters the shared virtual reality space, thereby realizing the virtual reality life object that always follows its keeper about.

An intimate expression of feelings may be realized by making a virtual reality object periodically appear and moving around in a shared virtual reality space while its client is not accessing the virtual reality space and report an event encountered during the moving around (for example, an event of being fed by another client or picking up a virtual reality object) to its client through a text-based chat window.

Experience of an event in a shared virtual reality space may be reported from the virtual reality life object to the client through a voice chat to provide an intimacy emotional expression. Alternatively, this report may be made through a voice chat capability as an analog voice message based on text-to-voice conversion supported by text reading software. Alternatively still, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message through the voice chat capability. For the conversion between text and voice, the technology disclosed in Japanese Patent Laid-open No. 09-214486 corresponding to U.S. application Ser. No. 08/789,083 is available.

The following describes the capability of notification to the client based on an existing communication infrastructure and the capability of simplifying the operation of a virtual reality pet based on an existing communication infrastructure.

For example, if the appetite index of a virtual reality life object increases or its remaining life time goes below a predetermined value, the virtual reality life object (the AO server 13) notifies, through the mail server 15 or the communication server 16, its keeper at the keeper's address of contact of this change by use of the contacting means (FIG. 8) previously set to the growth parameter control table. If the keeper cannot immediately access the personal computer under situations that the keeper is away from the personal computer or the personal computer itself is malfunctioning for example, the keeper can later check requests of the virtual reality pet and make communication with it.

On the other hand, a service provider for providing services for virtual reality pet breeding such as described so far can evoke a motivation of a kind that the user must soon access the virtual reality pet. This provides a by-product that the service provider can ensure regular access, contributing to its stable management.

The following describes a particular example for realizing the above-mentioned notification capability based on an existing communication infrastructure.

The communication server 16, one of the servers for controlling the autonomous behavior of a virtual reality life object in a shared virtual reality space, is provided with a communication control table (a table corresponding to the keeper data in the growth parameter control table shown in FIG. 8) for controlling the type of a. message notification means (or a message notification method) for making notification to the user, or the keeper of each virtual reality life object and controlling the address of contact of the keeper. As the state of the virtual reality life object changes (the communication server 16 is notified of this change by the AO server 13), the message is sent to the address of contact by use of the communication means registered in the communication control table. This allows actual communication from the shared virtual reality world to the real world.

The ID for identifying each user, or the keeper of each virtual reality life object and the history access by the user having this ID are controlled by this communication control table. Based on the access history, a message "I miss you" for example may be sent to a user who has not accessed his or her virtual reality life object for over a certain period.

Further, based on the access history, an optimum message statement may be selected from among plural message statements. The day after the day on which access has been made by the user, a message "Thank you for playing with me. Let's play again" for example may be sent from the virtual reality life object to its keeper. If no access has been made for over one week for example, a message "Are you busy these days? Please come to play with me sometimes" for example is sent.

A transition in the state of a virtual reality life object is sensed based on the updated content of the growth parameter control table, an optimum message statement is selected from among plural message statements, and the selected message is sent. For example, the day after the day on which the virtual reality life object has been fed much, a message "I'm still full" for example is sent. If no access has been made for one week for example, a message "I'm starving to death" for example is sent. In a scenario in which a virtual reality life object is aged one year in one week, its birthday comes every week and a message "I have become 10 years old today. Please look at grown-up me" for example is sent. If the allocated remaining life time is nearly expiring, a message "I have to go somewhere far away soon. Please be with me when I die" for example is sent.

The mail server 15 may be provided with a part of the communication control table associated with electronic mail to send a text-based message to the keeper of each virtual reality life object at his or her electronic mail address (including his or her ID) by the communication control table of the mail server 15.

In addition to an electronic mail transmitted through the Internet 7, a message may be sent from the communication server 16 through the public telephone network 17 to the portable telephone terminal 23 based on wireless communication or to the pager terminal 24 to be displayed on the LCD of the wireless telephone terminal or the pager.

Alternatively, the telephone number (including the ID) of the user of each virtual reality life object may be controlled by the communication control table to automatically calling the user at his or her registered telephone number from the communication server 16, thereby sending a voice message. In this case, this notification may be made as an analog voice message based on text-to-voice conversion supported by text reading software through the ordinary telephone 8 or the portable telephone terminal 23. Alternatively, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message.

The facsimile number (including the ID) of the user of each virtual reality life object may be controlled by the communication control table to automatically call the user at this facsimile number, thereby sending a message to the facsimile 19.

Further, by use of a terminal such as the telephone 18 that has received the above-mentioned message from the virtual reality pet, two-way communication may be made between the keeper and its virtual reality pet from this terminal by a simplified operation.

The following describes a particular example of realizing the capability of performing a simplified operation on a virtual reality pet by use of an existing communication infrastructure.

For example, the shared server 12 can interpret an operation command returned with the ID (caller ID) of the user through the portable telephone terminal 23 or the telephone 18, recognize the operation command as a message to the corresponding virtual reality life object, send the message to the AO server 13, and reflect the content of the message onto the state transition (updating of a growth parameter) of the virtual reality life object.

For the above-mentioned returned operation command, a DTMF (Dual-Tone Multi-Frequency) signal that is generated when a push button on the telephone 18 is pressed for example may be used.

In addition, by use of Web-On-Call (registered trademark) voice browser by NetPhonic Communications Inc. (located at www.netphonic.com/ using HTTP) for example, various notifications to a virtual reality pet may be made. This voice browser allows access to servers from the ordinary telephone 18 by voice. This voice browser has a text reading capability, so that a mail from a virtual reality pet can be heard in voice. Moreover, this voice browser can also send text by facsimile or electronic mail.

It should be noted that the shared server 12, the AO servers 13 and 14, the mail server 15, and the communication server 16 execute various capabilities in a shared manner, thereby realizing a service for providing a shared virtual reality space to client PCs as a whole system.

The following describes a chat capability to be executed in this shared virtual reality space. Chat is classified into public chat and personal chat. In public chat, conversation uttered by one client (user) at a predetermined location in the shared virtual reality space is transmitted to other nearby clients (users) or all clients in the shared virtual reality space.

In personal chat, conversation is made only with a specified party. This specification is performed by clicking the mouse button on a desired virtual reality life object while pressing the shift key of the keyboard 42 for example. When the other party of chat is specified, chat made by the client who has made that specification is directed only to the specified party.

In voice chat, contents of chat are transmitted in a voice signal; in text chat, they are transmitted in text. In voice chat, voice data captured by the microphone 36 is transmitted to the clients (users) nearby or specified virtual reality life objects to be sounded from the speakers 37 and 38 of the PCs of these clients.

In text chat, text entered from the keyboard 42 is transmitted also to the clients (users) of nearby or specified virtual reality life objects to be displayed on the CRT monitor 45 of the client PCs.

The user can select between voice chat and text chat as required.

Figure 17:
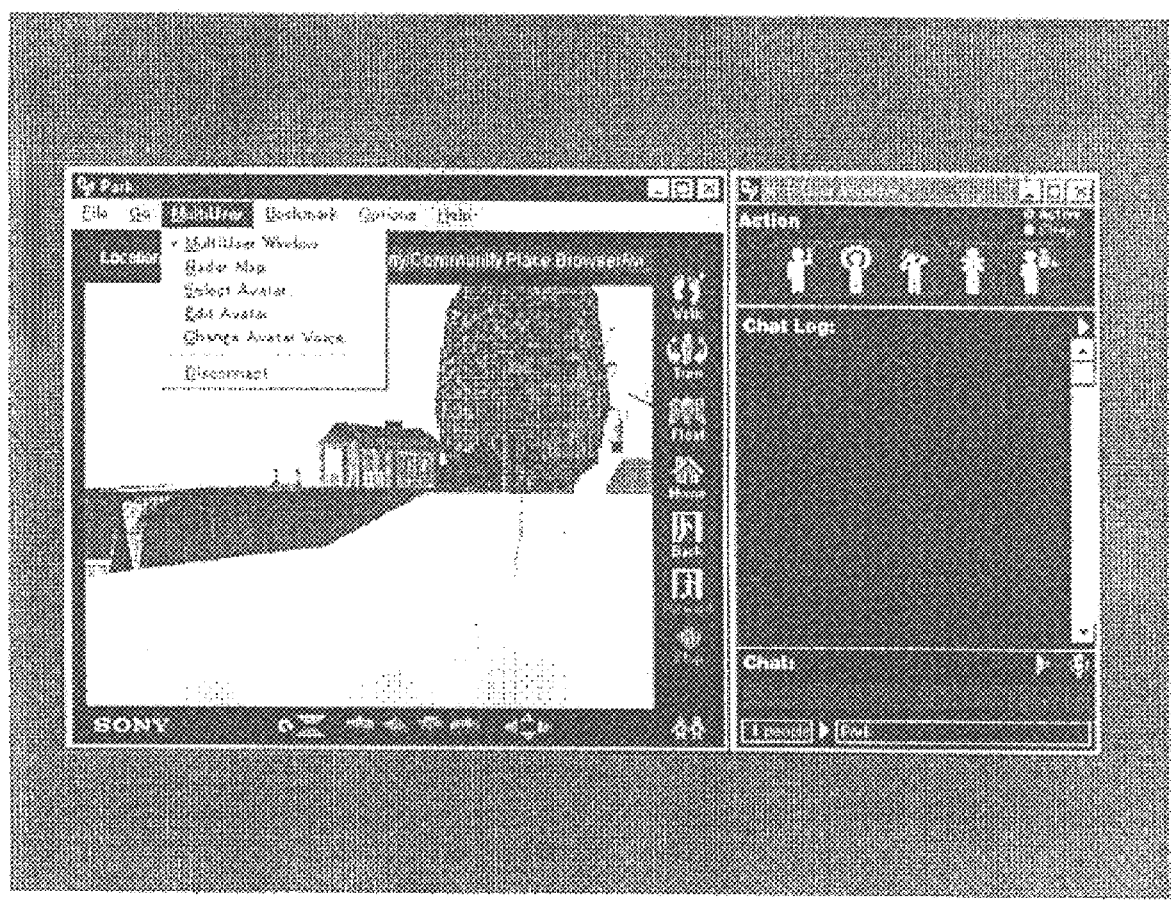
FIG. 17 shows a photograph indicative of a display example of a shared virtual reality space.
Figure 18:
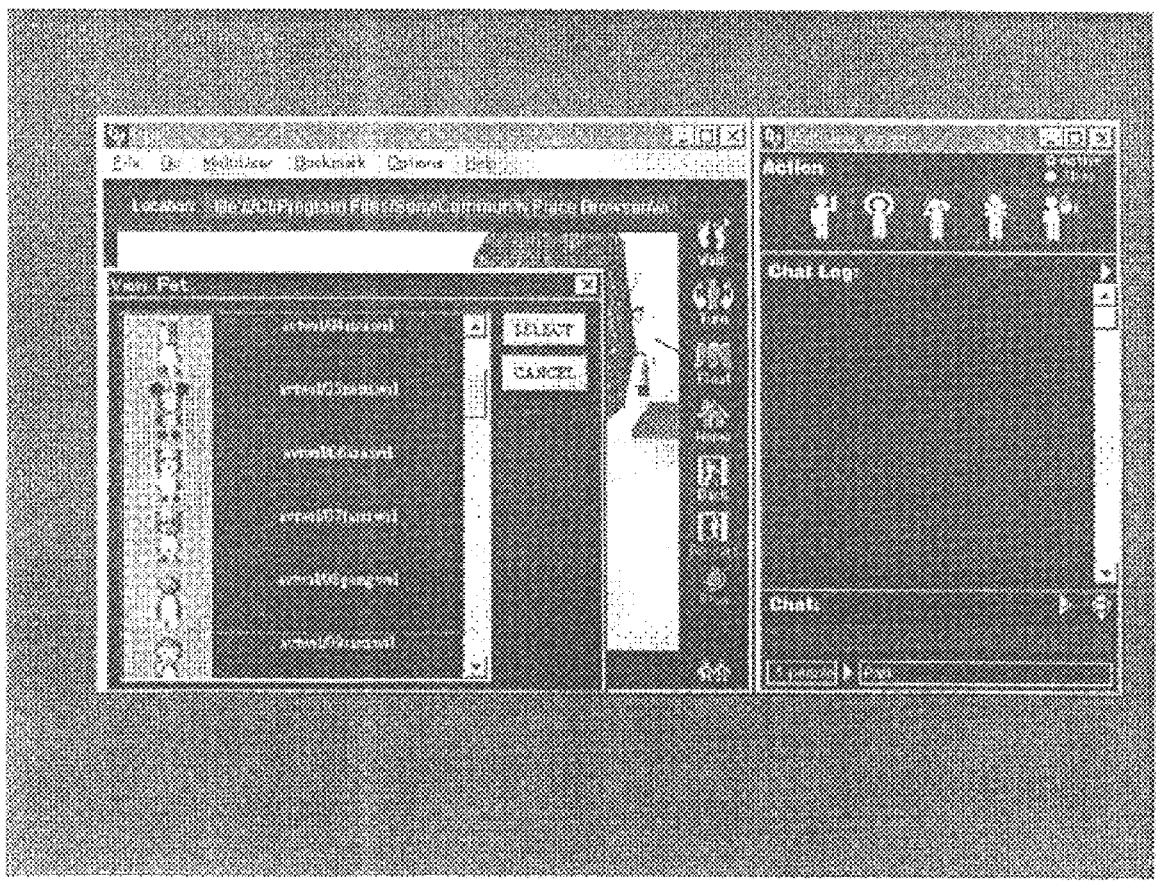
FIG. 18 shows a photograph indicative of another display example of the shared virtual reality space.

To select a virtual reality pet to be bred in the shared virtual reality space, the client clicks "Multi User" item in the screen. When this item is clicked, a menu bar appears as shown in FIG. 17. From the menu bar, the client selects "Select Pet". Then, "View Pet" window appears as shown in FIG. 18, in which various virtual reality pet images are displayed. The client selects a desired one of these virtual reality pets. It should be noted that the images of virtual reality pets displayed in the "View Pet" window are the initial images, namely the images at their births. As described earlier, the image of each virtual reality pet gradually changes as it grows. After the selection, the client presses the "SELECT" button with the mouse 41.

Figure 19:
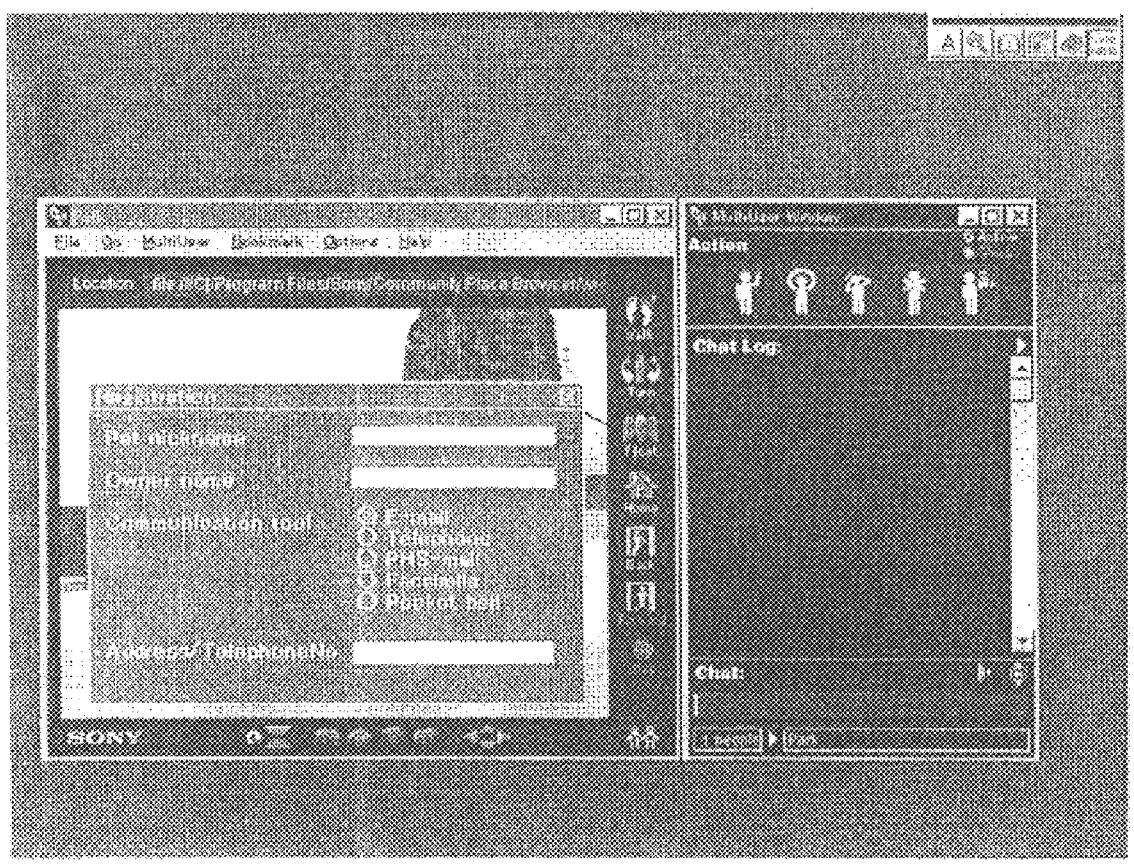
FIG. 19 shows a photograph indicative of still another display example of the shared virtual reality space.

When the selection of the virtual reality pet has been completed, a window "Registration" for registering the information about the selected virtual reality pet appears as shown in FIG. 19. The client enters the name of the virtual reality pet "Pet Nickname," the name of the owner (keeper of the pet) "Owner Name," and the address and telephone number "Address/Telephone No." of the owner from the keyboard 42.

Further, the client selects a communication tool as the above-mentioned contacting means or notification means from "E-mail," "Telephone," "PHS-mail (wireless communication mail)," "Facsimile," and "Pocket Bell (pager)."

Figure 20:
FIG. 20 shows a photograph indicative of yet another display example of the shared virtual reality space.
Figure 21:
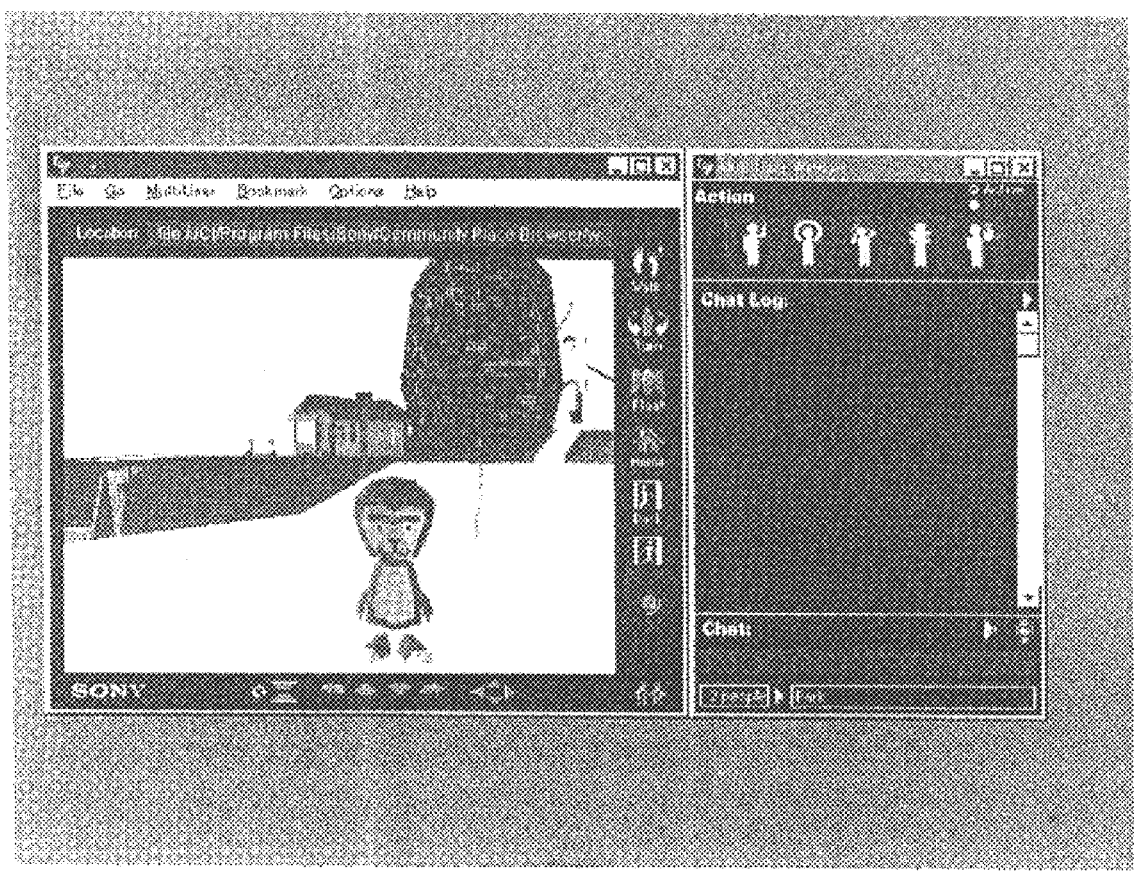
FIG. 21 shows a photograph indicative of a different display example of the shared virtual reality space.

FIG. 20 shows an example in which a monkey for example has been selected as the virtual reality pet. As described earlier, this virtual reality pet (monkey) grows based on growth parameters to be updated by various events. FIG. 21 shows a state of the virtual reality pet in which it has grown from the state shown in FIG. 20. As shown in FIG. 21, the pet is larger in physique and its countenance has changed to that of an adult monkey than that shown in FIG. 20.

Thus, the user can enjoy more realistic changes in a shared virtual reality space.

Figure 22:
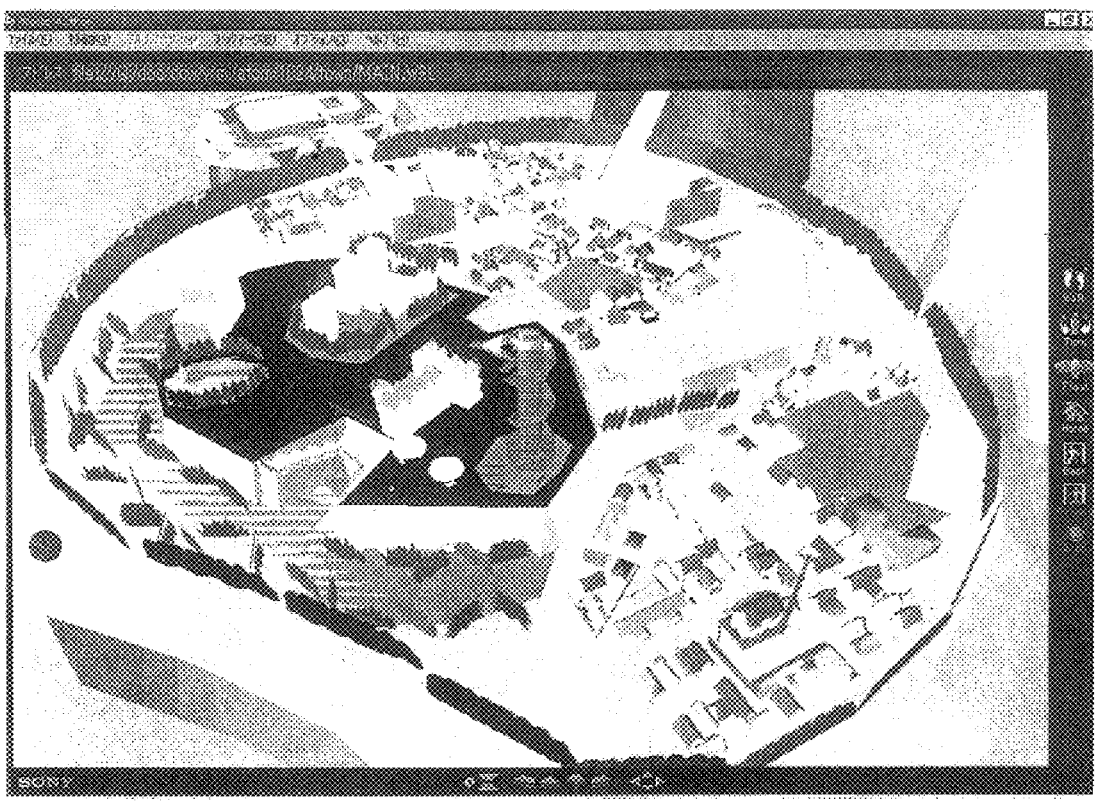
FIG. 22 shows a photograph indicative of a still different display example of the shared virtual reality space.
Figure 23:
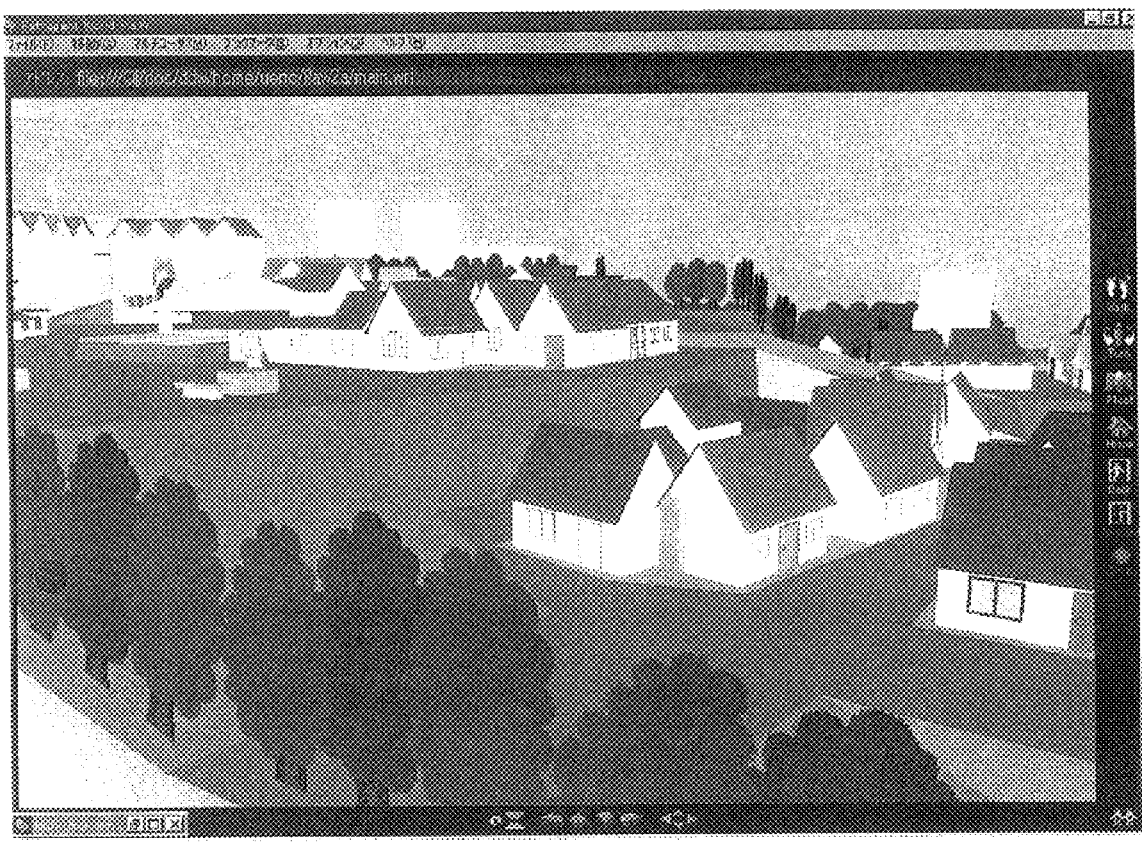
FIG. 23 shows a photograph indicative of a yet different display example of the shared virtual reality space.

The following describes calling-card exchange and mail exchange operations with reference to particular examples displayed on the CRT monitor of the client PCs. FIG. 22 shows a bird's-eye-view display example of a three-dimensional shared virtual reality space to be provided when the client PC1 accesses the shared server 12 for example. FIG. 23 shows the three-dimensional shared virtual reality space as looked down from one side thereof.

To exchange mails in the above-mentioned three dimensional shared virtual reality space, a calling-card exchange operation (this does not require the mail address of the other party) must be executed as a first stage. Then, a mail exchange operation (this requires the mail address of the other party) of a second stage can be executed. A calling card herein denotes a card possessed by each client in a virtual reality space. Each calling card contains data such as a client name, a virtual reality pet name, a time at which the calling card has been placed, and a short communication message. In addition, each calling card contains the holder's mail address information that is required for mail exchange.

In the calling-card exchange of the first stage, a calling-card offering client hands his or her calling card to a calling-card receiving client through a virtual reality pet reared by the calling-card receiving client.

In calling-card exchange, there are three types of relationships between calling-card offering client and calling-card receiving client. Namely, client A hands his or her calling card to client B accessing a shared virtual reality space at the same time; client A hands his or her called card to client C not accessing a shared virtual reality space at the same time; and client A hands his or her calling card to unspecified client D (that is, distributing the calling without specifying receivers).

In the mail exchange of the second stage, the client can send a mail to a client that has received the calling card (or a client of which mail address was known to the sending client).

Figure 24:
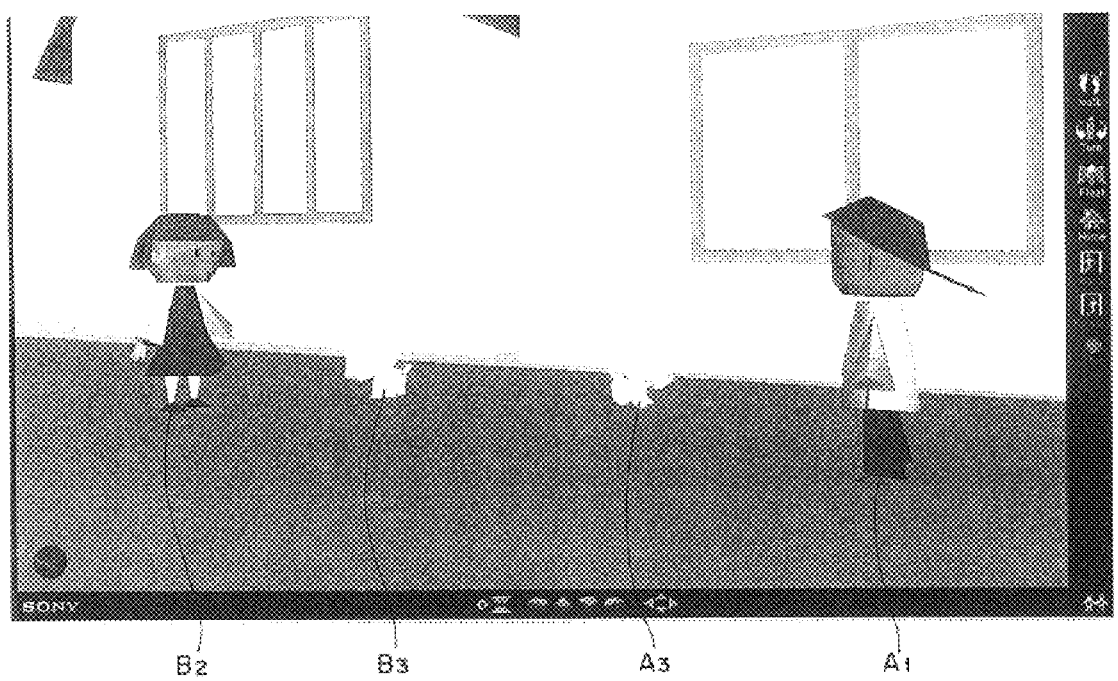
FIG. 24 shows a photograph indicative of a separate display example of the shared virtual reality space.
Figure 25:
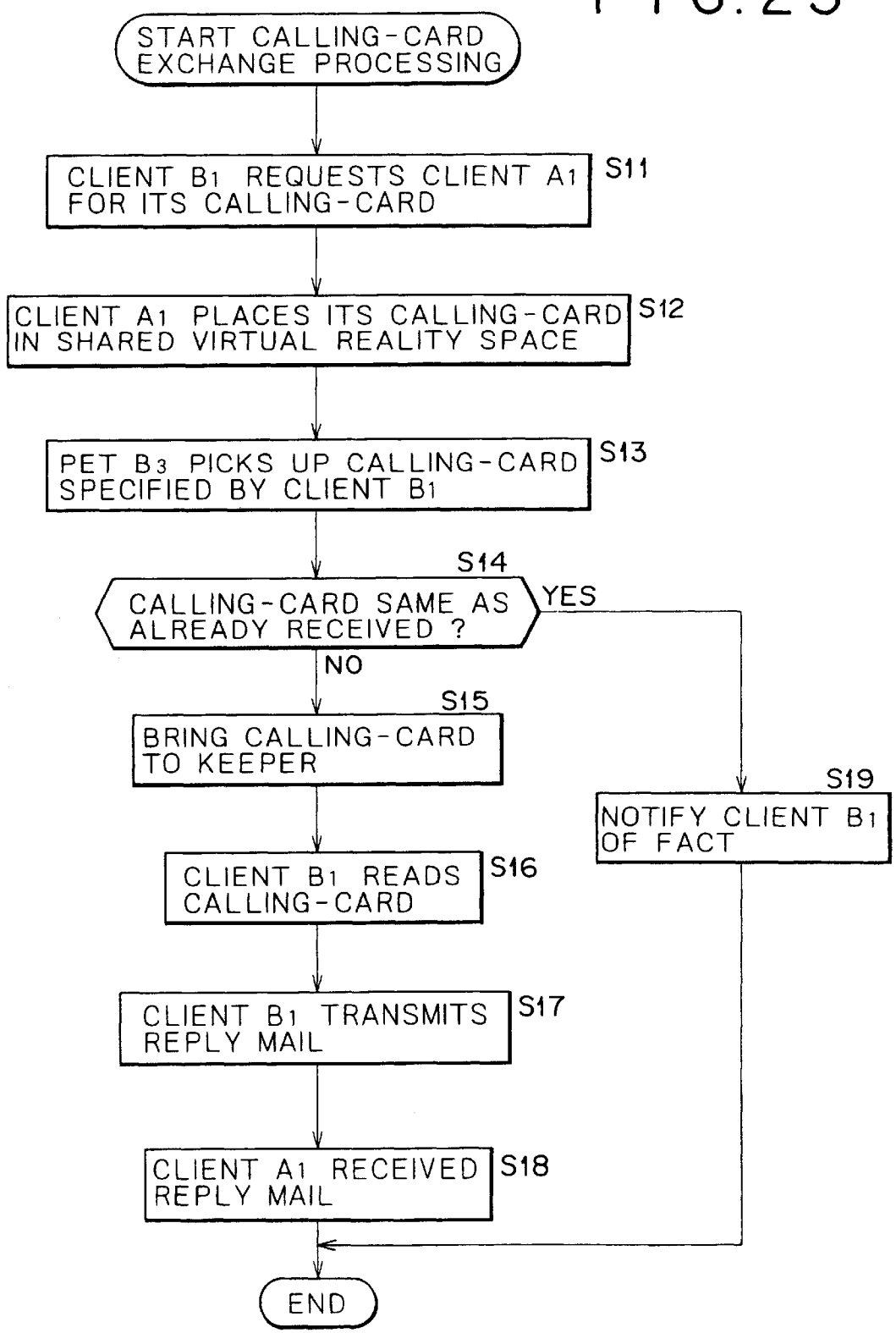
FIG. 25 is a flowchart describing calling-card exchange processing.

First, an operation will be described with reference to the flowchart of FIG. 25, in which client $A_1$ hands his or her calling card to client $B_1$ accessing a shared virtual reality space as shown in FIGS. 22 and 23 at the same time and client $B_1$ returns a mail to client $A_1$. It should be noted that, as shown in FIG. 24, avatar $A_2$ corresponding to client $A_1$ and avatar $B_2$ corresponding to client $B_1$ are accompanied by virtual reality pet $A_3$ and virtual reality pet $B_3$ respectively.

Figure 26:
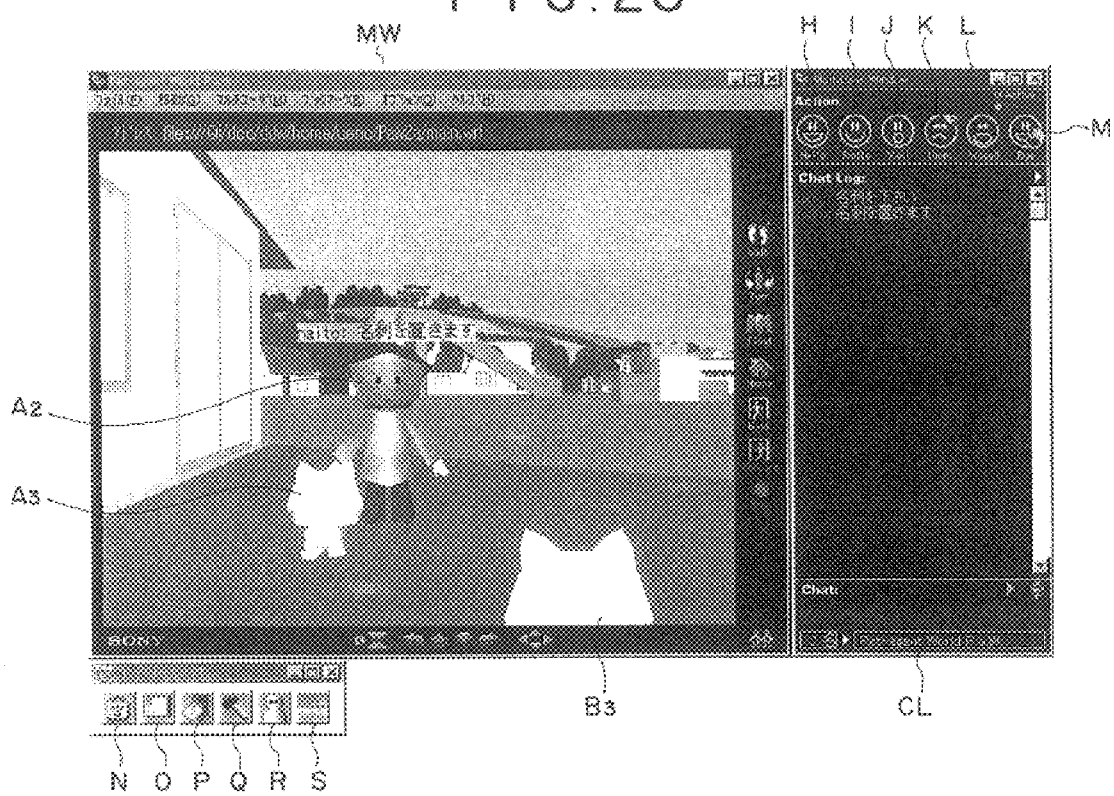
FIG. 26 shows a photograph indicative of a still separate display example of the shared virtual reality space.

In step S11, client $B_1$ sends message "Give me your calling card" for example by use of above-mentioned personal chat as shown in the chat log box CL displayed to the right of the main window MW shown in FIG. 26.

In this example, the name of avatar $A_2$ is "naito" and name of avatar $B_2$ is "ueno", which holds the same with the following examples.

The following describes the displays other than the main window MW shown in FIG. 26. In the chat log box CL, contents of chart are shown as described above.

Clicking a button on the Action panel located over the chat log box CL allows the client to make his or her avatar act in a predetermined manner (animation display). Namely, clicking "Hello" button H makes the avatar perform greetings. Clicking "Smile" button I makes the avatar smile. Clicking "Wao" button J makes the avatar to act in a surprised manner. Clicking "Umm.." button K makes the avatar act in a sorrowful manner. Clicking "Wooo!!" button L makes the avatar act in an angry manner. Clicking "Bye" button M makes the avatar act farewell.

Clicking a button on the control panel located below the main window MW allows the client to execute predetermined processing or predetermine settings. Namely, clicking the item button N displays a list of items possessed by the client. Clicking the calling-card button O displays a list of calling cards (namely a calling-card holder). Clicking post button P displays a list of received mails. Clicking hammer button Q displays a user setting window (in which an avatar nickname and other information are set). Clicking transparent-man button R makes own avatar transparent as viewed from other avatars. Clicking viewpoint switch button S makes the main window display between an image viewed from avatar and an image viewed from a third party behind the avatar.

Figure 27:
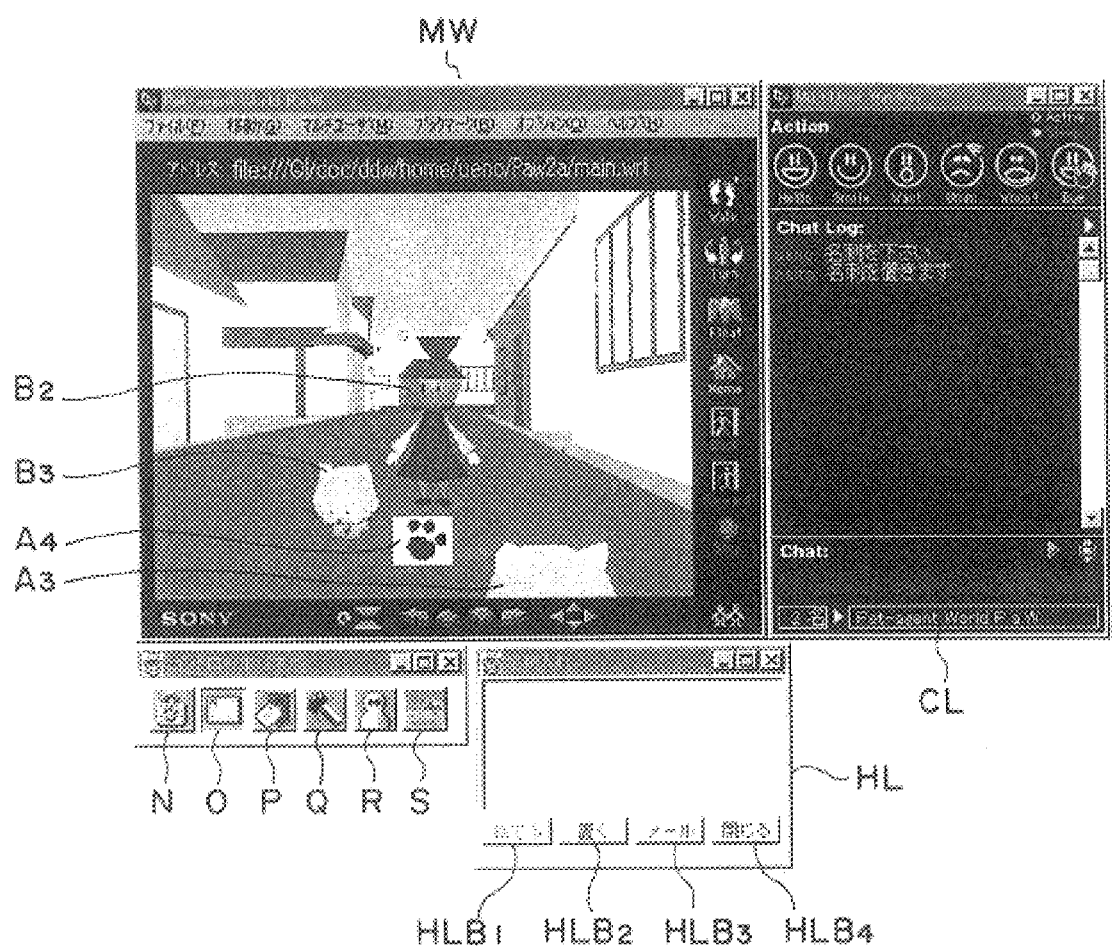
FIG. 27 shows a photograph indicative of a yet separate display example of the shared virtual reality space.

In step S12, client $A_1$ sends message "I'll place my calling card" for example to client $B_1$ through chat. In response, text "I'll place my calling card" appears in the chat log box CL as shown in FIG. 26. Then, client $A_1$ clicks calling-card button O on the control panel to open the calling-card holder HL, specifies his or her own calling card in the calling-card holder HL, and click "Place" button $HLB_2$. Consequently, calling card $A_4$ of client $A_1$ is placed in the shared virtual reality space as shown in the main window (as viewed from avatar A viewpoint) MW shown in FIG. 27.

It should be noted that the calling-card holder HL is also provided with "Discard" button $HLB_1$ for throwing aside a calling card, button $HLB_3$ for sending a mail, and "Close" button $HLB_4$ for closing the calling-card holder HL.

In step S13, client $B_1$ clicks the calling card $A_4$ of client $A_1$ placed in the shared virtual reality space. This makes virtual reality pet $B_3$ reared by client $B_1$ go to pick up the calling card $A_4$. When the calling card $A_4$ is picked up by virtual reality pet $B_3$, the information conveyed on the calling card $A_4$ is transmitted to client $B_1$.

In step S14, virtual reality pet $B_3$ determines whether the calling card $A_4$ is already possessed by client $B_1$, its keeper, (namely whether the calling card $A_1$ is stored on the HDD 31). If the calling card $A_4$ is not found stored, the processing goes to step S15.

In step S15, virtual reality pet $B_3$ brings the picked up calling card $A_4$ to avatar $B_2$ of its keeper (client $B_1$). The calling card $A_4$ (namely, the calling card of naito) is added to the calling-card holder HL of client $B_1$.

Figure 28:
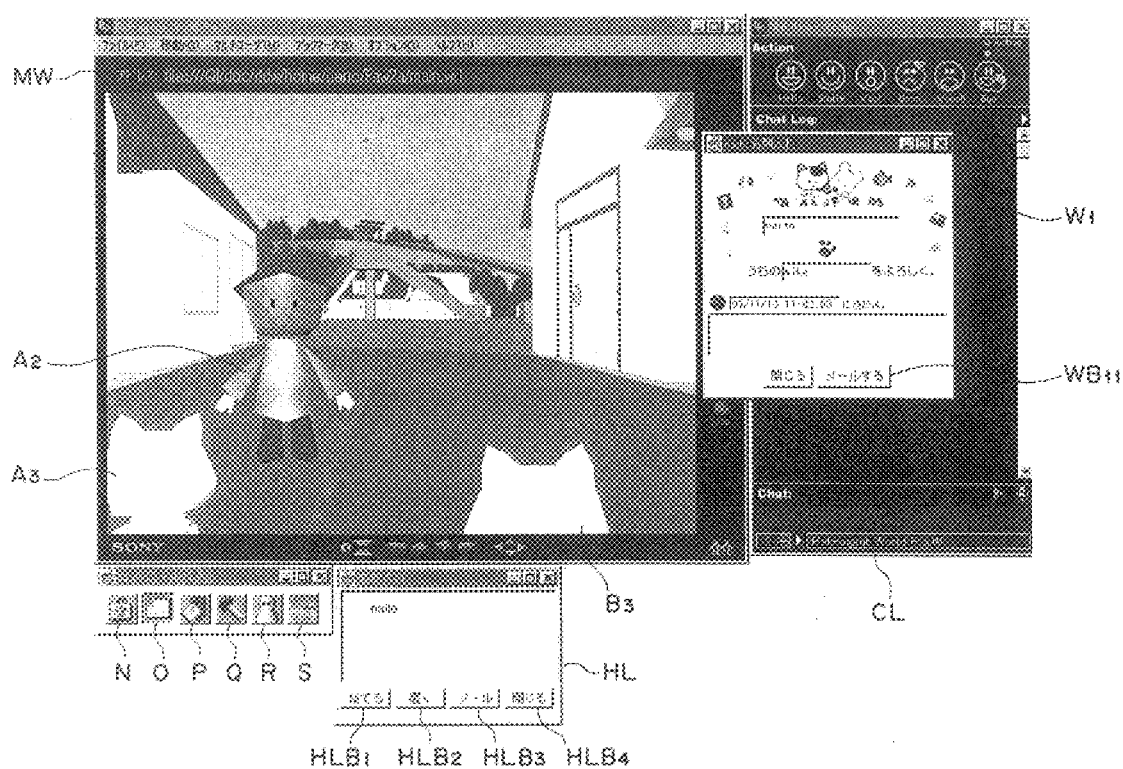
FIG. 28 shows a photograph indicative of another display example of the shared virtual reality space.

In step S16, client $B_1$ clicks the calling-card button O on the control panel to open the calling-card holder HL as shown in FIG. 28, specifies the added calling card $A_4$ of client $A_1$, and clicks "Mail" button $HLB_3$. This displays window W1 showing the contents of the calling card $A_4$ of client $A_1$ as shown in FIG. 28.

Figure 29:
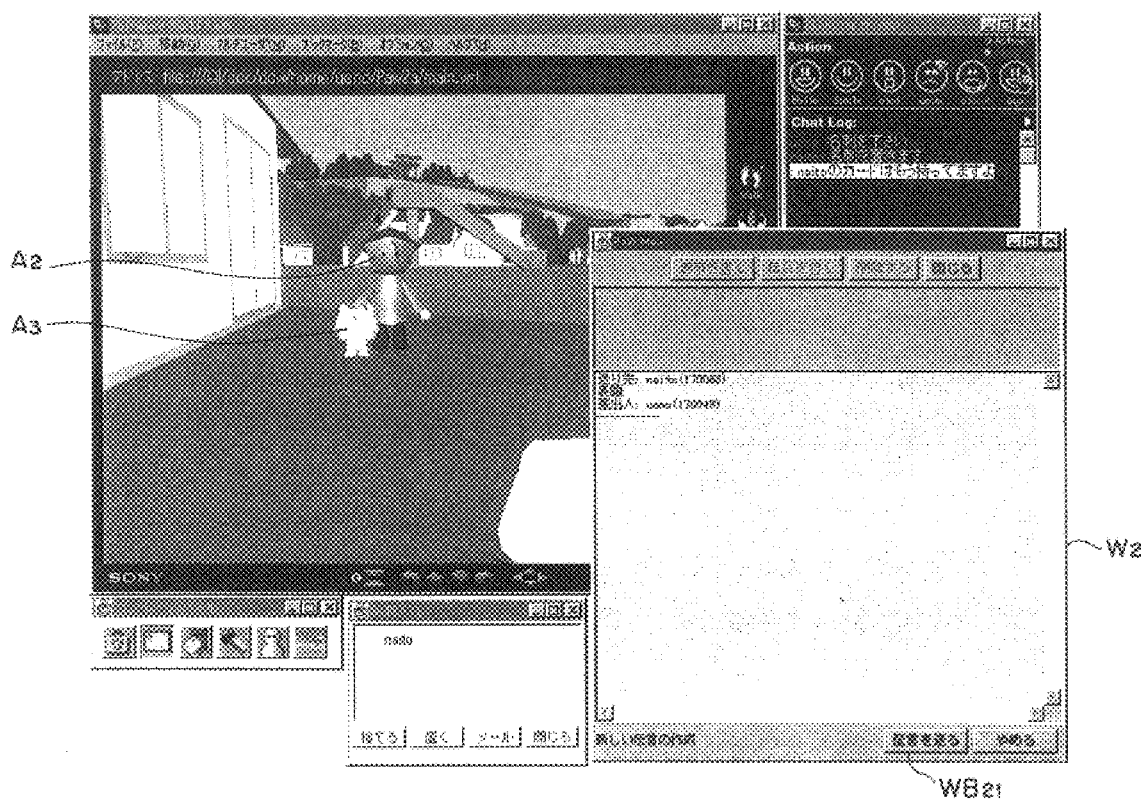
FIG. 29 shows a photograph indicative of still another display example of the shared virtual reality space.

In step S17, client B, clicks "Send Mail" button $WB_{11}$ of the displayed calling card to send a return mail to the calling card. This opens a mail exchange window $W_2$ as shown in FIG. 29. At this moment, the name of client $A_1$ and mail address "naito(170063)" referenced from the calling card $A_4$ of client $A_1$ automatically appear in the destination box of the main exchange window $W_2$. At the same time, the name and the mail address "ueno(170049)" of client $B_1$ automatically appear in the sender box. For the sender mail address, one stored in the growth parameter control table is referenced as shown in FIG. 8.

Figure 30:
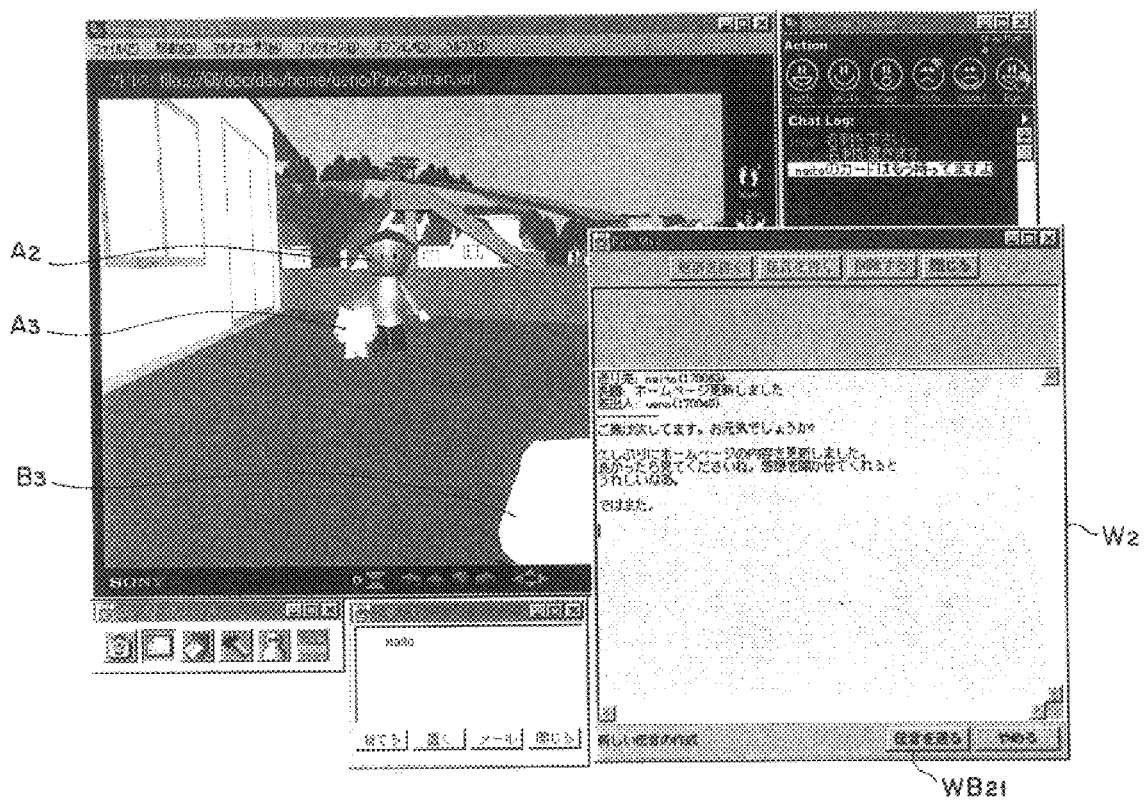
FIG. 30 shows a photograph indicative of yet another display example of the shared virtual reality space.
Figure 31:
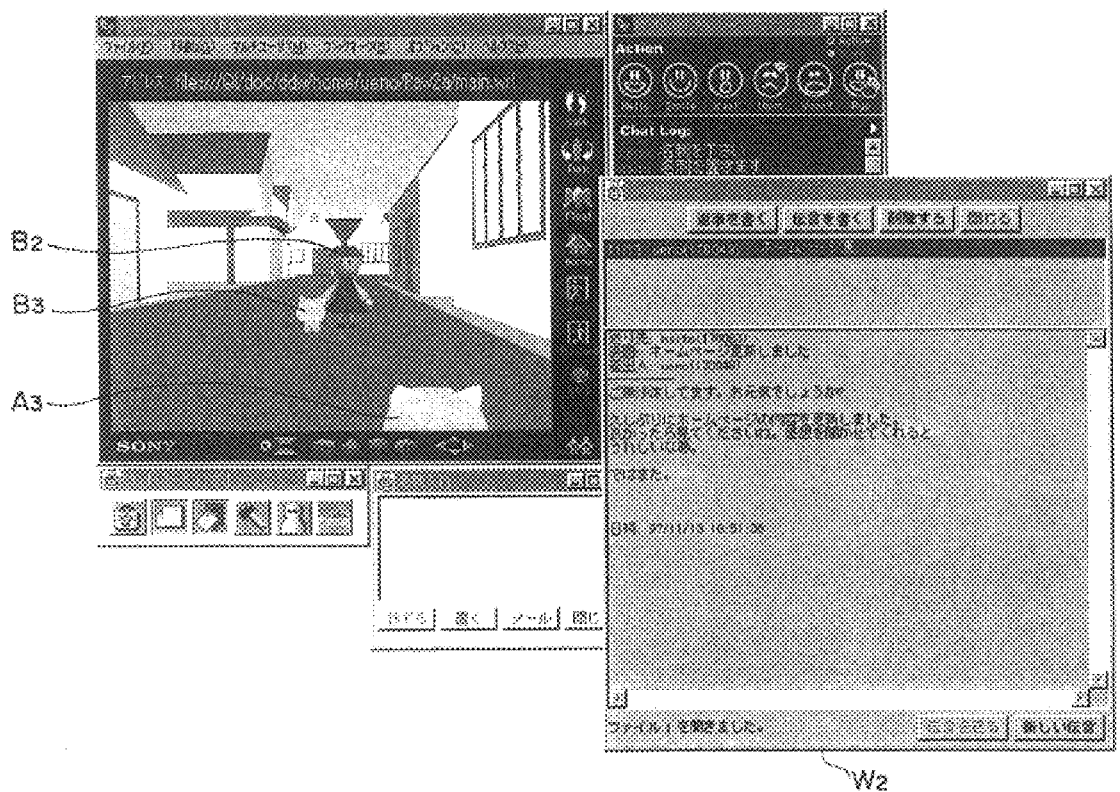
FIG. 31 shows a photograph indicative of a different display example of the shared virtual reality space.

Client $B_1$ types a title and a body such as "I updated my home page" or "Long time no see. How are you? I updated the contents of my home page after a long time" for example as shown in the mail exchange window $W_2$ of FIG. 30. Then, client $B_1$ clicks "Send Message" button $WB_2$ of the mail exchange window $W_2$. This operation sends this return mail to client $A_1$ through the mail server 15.

In step S18, the return mail from client $B_1$ is received by the client PC of client $A_1$ to be added to its mail holder. Client $A_1$ clicks the post button P on the control panel to open the mail holder, not shown, specifies the return mail from client $B_1$, and clicks "Open" button. This displays the return mail from client $B_1$ in the mail exchange window $W_2$.

Figure 32:
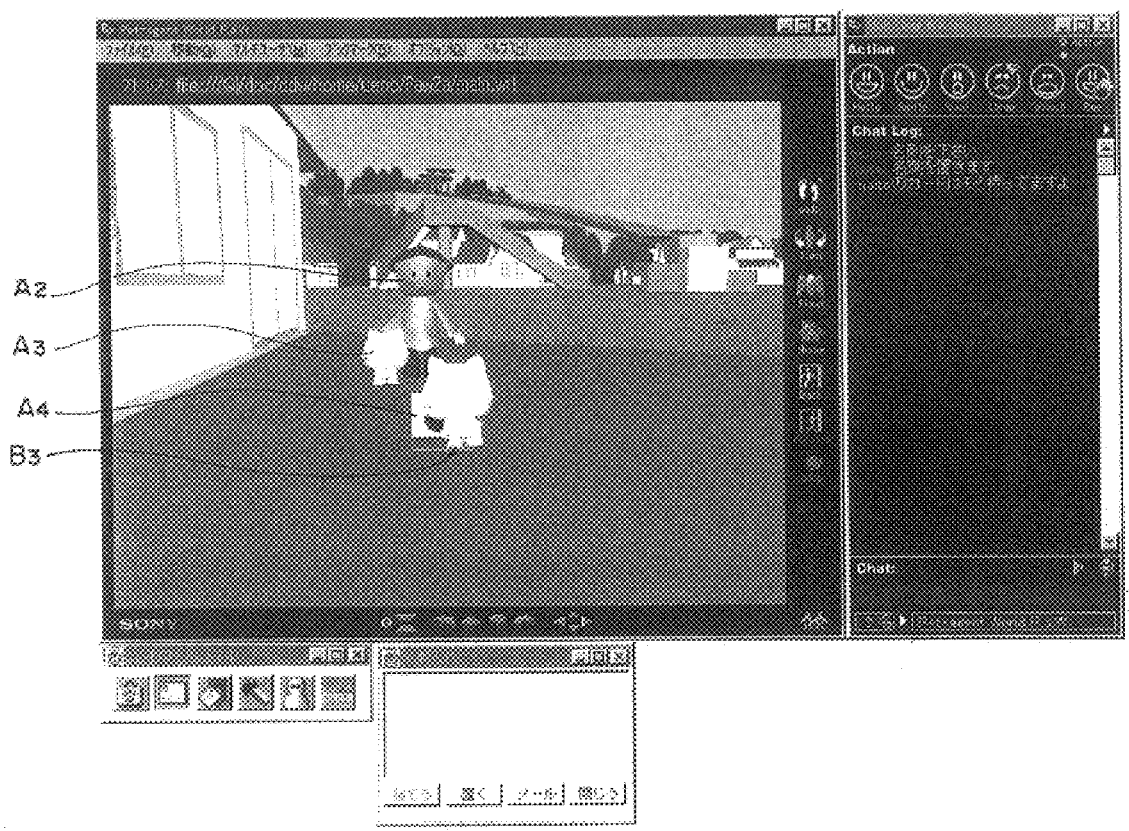
FIG. 32 shows a photograph indicative of a still different display example of the shared virtual reality space.
Figure 33:
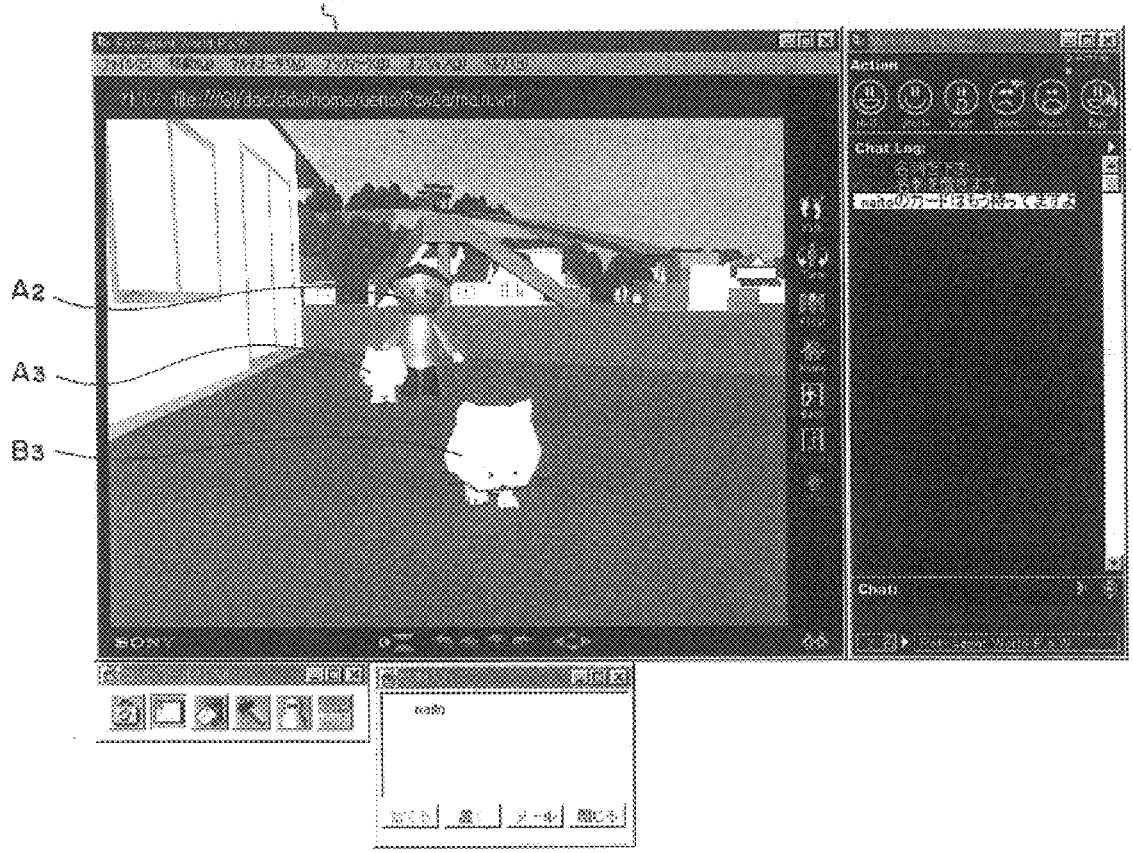
FIG. 33 shows a photograph indicative of a yet different display example of the shared virtual reality space.

If the picked up calling card $A_4$ is found already possessed by the keeper in step S14, the processing goes to step S19. In step S19, virtual reality pet $B_3$ notifies client $B_1$ of "You already have the calling card of naito (client $A_1$)" by use of chat as shown in the chat log box of FIG. 32 and returns to avatar $B_2$ without the calling card as shown in the main window (as viewed from the viewpoint of avatar $B_2$) of FIG. 33.

Figure 34:
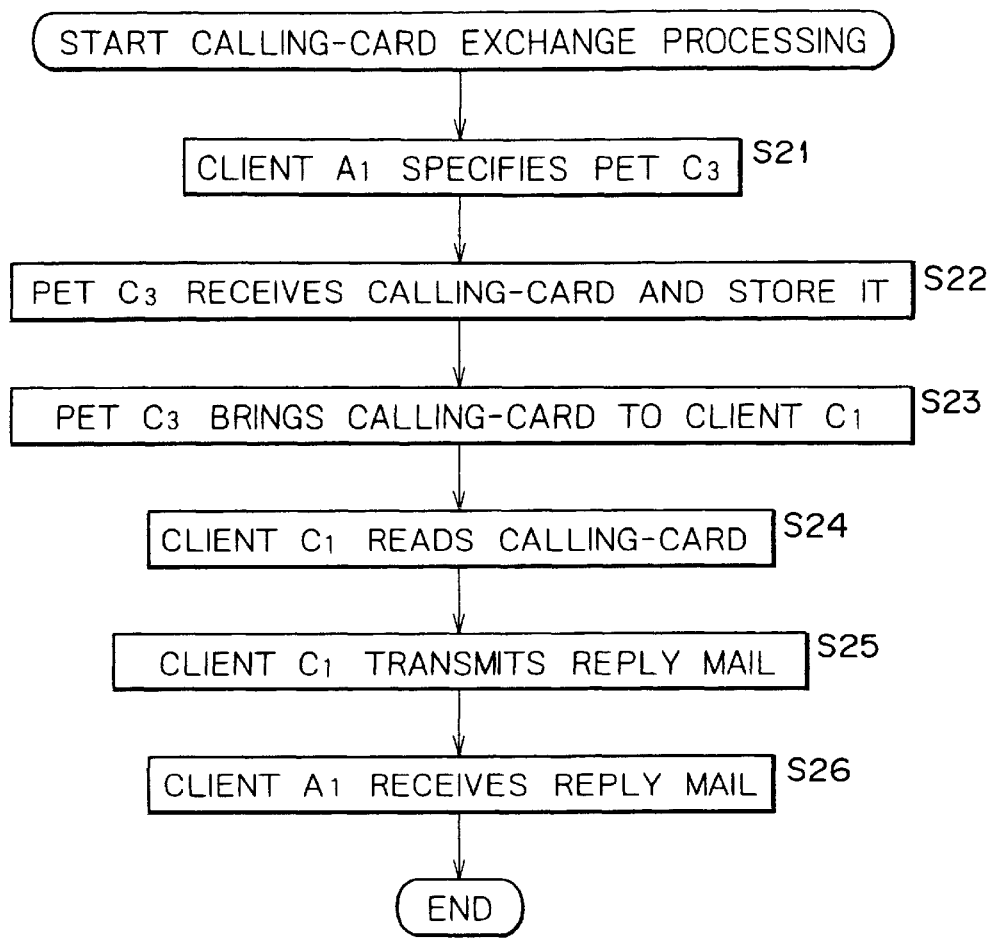
FIG. 34 is a flowchart describing calling-card exchange processing.

The following describes an operation in which client $A_1$ passes his or her calling card to client $C_1$ who is not accessing the shared virtual reality space at the same time with reference to the flowchart of FIG. 34. In step S21, client $A_1$ searches the virtual reality pets walking about without being accompanied by their keepers (avatars) in the shared virtual reality space for virtual reality pet $C_3$ reared by client $C_1$ to whom client $A_1$ wants to pass his or her calling card and specifies virtual reality pet $C_3$. Virtual reality pet $C_3$ can be specified by clicking the same while pressing the Shift key of the keyboard 42 for example as in the above-mentioned personal chat.

In step S22, client $A_1$ clicks the calling-card button O of the control panel to open the calling-card holder HL, specifies his or her calling card in the calling-card holder HL, and clicks "Place" button $HLB_2$. This passes the calling card of client $A_1$ to virtual reality pet $C_3$. Receiving the calling card, virtual reality pet $C_3$ holds the same until client $C_1$, its keeper, accesses the shared virtual reality space.

When client $C_1$ accesses the shared virtual reality space, virtual reality pet $C_3$ brings the calling card of client $A_1$ in its mouth to avatar $C_2$ (client $C_1$) in step S23. The calling card is added to the calling-card holder HL of client $C_1$.

In step S24, client $C_1$ clicks the calling card button O of the control panel to open the calling-card holder HL, specifies the calling card of client $A_1$ added to the calling-card holder HL, and clicks "Mail" button $HLB_3$. This displays the calling card of client $A_1$ in the calling-card window $W_1$.

In step S25, client $C_1$ clicks "Send Mail" button $WB_{11}$ in the calling-card window $W_1$ to open the mail exchange window $W_2$ to send a return mail for the calling card. Client $C_1$ types a title and a body and clicks "Send Message" button $WB_{21}$ in the main exchange window $W_2$. This transmits this return mail to client $A_1$ through the mail server 15.

In step S26, receiving the return mail, the client $A_1$ clicks the mail holder button P of the control panel to open the mail holder, specifies the return mail from client $C_1$ in the mail holder, and clicks "Open" button. This displays the return mail from client $C_1$ in the mail exchange window $W_2$.

Figure 35:
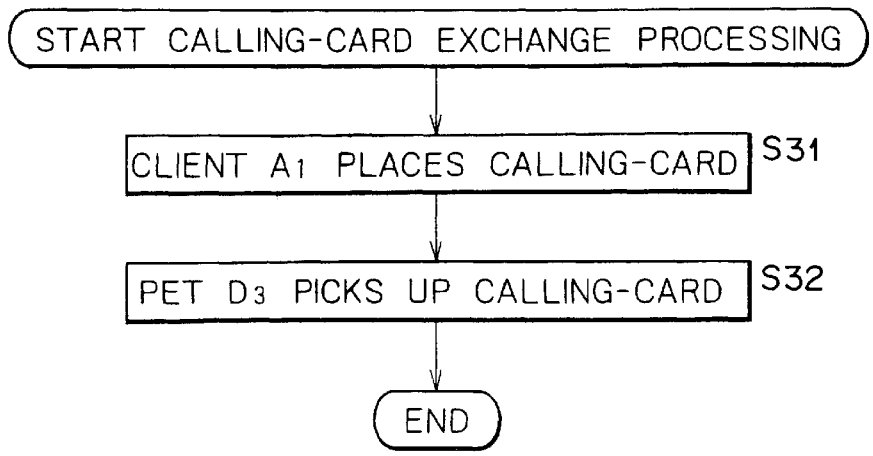
FIG. 35 is another flowchart describing calling-card exchange processing.

The following describes an operation in which client $A_1$ passes his or her calling card to an unspecified client (namely, distributes the calling card without specifying a receiving party) with reference to the flowchart shown in FIG. 35.

In step S31, client $A_1$ clicks the calling-card button O of the control panel to open the calling-card holder HL, specifies his or her calling card in the calling-card holder HL, and clicks "Place" button $HLB_2$. This places the calling card of client $A_1$ in the shared virtual reality space.

In step S32, the calling card of client $A_1$ is found by virtual reality pet $D_3$ walking about alone (namely, its keeper is not accessing the shared virtual reality space) and picked up by it. Virtual reality pet $D_3$ holds this calling card and, when its keeper client $D_1$ accesses the shared virtual reality space, brings the calling card to client $D_1$.

The subsequent processing is generally similar to that of steps S24 and on shown in FIG. 34; therefore, the description of the subsequent processing is skipped.

In the above-mentioned preferred embodiment of the invention, the calling card for transmitting the mail address of a client to other clients who access a shared virtual reality space is transferred through virtual reality life objects. It will be apparent that mails may also be transmitted through virtual reality life objects.

The program for executing the above-mentioned various processing operations may be provided recorded on recording media such as a magnetic disc and CD-ROM disc or through networks such as the Internet.

As described and according to the invention, the client apparatus practiced as one preferred embodiment of the invention makes a virtual reality life object in a shared virtual reality space get information arranged therein and a user, the keeper of the virtual reality life object, obtain the information through the virtual reality life object.

As described and according to the invention, the server apparatus practiced as another preferred embodiment of the invention controls the autonomous behavior of a virtual reality life object in a shared virtual reality space, transferring information obtained by the virtual reality life object in the shared virtual reality space to the client apparatus.

Consequently, passing a calling card to a virtual reality life object reared by a user not accessing a shared virtual reality space at a particular moment realizes communication between users not accessing the shared virtual reality space at the same time.

While the preferred embodiments of the present invention have been described using specific terms, such description is for illustrative purposes only, and it is to be understood that changes and variations may be made without departing from the spirit or scope of the appended claims.

What is claimed is:

1. An information processing method for an information processing apparatus to be provided with a shared virtual reality space from a server through a network along with another information processing apparatus, comprising:
   instructing a first object related to a user in said shared virtual reality space to obtain predetermined information arranged in said shared virtual reality space; and
   receiving, by a second object related to the user in said shared virtual reality space, said predetermined information from said first object.

2. The information processing method according to claim 1, wherein said predetermined information contains a mail address of said user.

3. The information processing method according to claim 1, wherein said first object represents a virtual reality life.

4. The information processing method according to claim 1 further comprising a step of giving an instruction for arranging said predetermined information in said shared virtual reality space.

5. The information processing method of claim 1, wherein said first object represents a virtual reality pet and said second object represents a virtual reality avatar.

6. An information processing apparatus connected to a server through a network to be provided with a shared virtual reality space along with another information processing apparatus, comprising:
   instructing means for instructing a first object related to a user in said shared virtual reality space to obtain predetermined information arranged in said shared virtual reality space;and receiving means for receiving, by a second object related to the user in said shared virtual reality space, said predetermined information from said first object.

7. The information processing apparatus of claim 6, wherein said first object represents a virtual reality pet and said second object represents a virtual reality avatar.

8. An information providing medium for providing control information allowing an information processing apparatus connected to a server through a network along with another information processing apparatus to be provided with a shared virtual reality space from said server, said control information comprising steps of:

instructing a first object related to a user in said shared virtual reality space to obtain predetermined information arranged in said shared virtual reality space; and receiving, by a second object related to the user in said shared virtual reality space, said predetermined information from said first object.

9. The information providing medium of claim 8, wherein said first object represents a virtual reality pet and said second object represents a virtual reality avatar.

10. An information processing method for providing a shared virtual reality space to a plurality of client apparatuses through a network, comprising:

initiating an autonomous behavior of a first object existing in said shared virtual reality space to obtain information on behalf of a user; and transferring the information obtained by said first object in said shared virtual reality space to a second object related to the user in said shared virtual reality space.

11. The information processing method according to claim 10, wherein said information contains a mail address of said user.

12. The information processing method according to claim 10, wherein said first object represents a virtual reality life.

13. The information processing method according to claim 10 further comprising a step of arranging said information in said shared virtual reality space.

14. The information processing method of claim 10, wherein said first object represents a virtual reality pet and said second object represents a virtual reality avatar.

15. An information processing apparatus for providing a shared virtual reality space to a plurality of clients interconnected through a network, comprising:

control means for initiating an autonomous behavior of a first object existing in said shared virtual reality space to obtain information on behalf of a user; and transfer means for transferring information obtained by said first object in said shared virtual reality space to a second object related to the user in said shared virtual reality space.

16. The information processing apparatus of claim 15, wherein said first object represents a virtual reality pet and said second object represents a virtual reality avatar.

17. An information providing medium for providing control information for providing a shared virtual reality space to a plurality of client apparatuses through a network, comprising:

initiating an autonomous behavior of a first object existing in said shared virtual reality space to obtain information on behalf of a user; and transferring the information obtained by said first object in said shared virtual reality space a second object related to the user in said shared virtual reality space.

18. The information providing medium of claim 17, wherein said first object represents a virtual reality pet and said second object represents a virtual reality avatar.

* * * * *